United States Patent [19]
Willener

[11] Patent Number: 6,073,382
[45] Date of Patent: Jun. 13, 2000

[54] CONTAINMENT BOOM APPARATUS AND METHODS FOR USE IN HARVESTING BRINE SHRIMP EGGS

[76] Inventor: John A. Willener, 5415 S. 7500 West, Hooper, Utah 84315

[21] Appl. No.: 09/268,215

[22] Filed: Mar. 15, 1999

Related U.S. Application Data

[63] Continuation-in-part of application No. 08/760,478, Dec. 5, 1996, Pat. No. 5,890,311, and a continuation-in-part of application No. 09/018,157, Feb. 3, 1998, and application No. 09/018,157, which is a continuation-in-part of application No. 08/760,478.
[60] Provisional application No. 60/008,323, Dec. 7, 1995, and provisional application No. 60/008,330, Dec. 7, 1995.

[51] Int. Cl.⁷ .......................... A01K 74/00; A01K 79/00; E02B 15/04
[52] U.S. Cl. ...................... 43/4.5; 43/6.5; 43/4; 210/923; 210/776; 210/242.3; 56/9; 405/60
[58] Field of Search .................................. 43/4, 4.5, 6.5; 210/923, 776, 242.3, 242.1; 56/8, 9, DIG. 2; 114/255; 405/60, 63–77

[56] References Cited

U.S. PATENT DOCUMENTS

| | | |
|---|---|---|
| 1,061,082 | 5/1913 | Kahrs . |
| 1,486,485 | 3/1924 | Frissell . |
| 1,591,024 | 7/1926 | Dodge . |
| 2,081,146 | 5/1937 | Herrington ................................... 43/9 |
| 2,330,508 | 9/1943 | McColl ..................................... 210/44 |
| 2,786,542 | 3/1957 | Orfei et al. .............................. 182/26 |
| 2,786,592 | 3/1957 | Laham ..................................... 215/28 |
| 2,804,045 | 8/1957 | Scott ........................................ 119/2 |
| 2,832,168 | 4/1958 | Brown ..................................... 43/17.1 |
| 2,920,606 | 1/1960 | Anderson .................................. 119/2 |
| 2,984,207 | 5/1961 | Drake ....................................... 119/2 |
| 3,029,784 | 4/1962 | Elbreder et al. .......................... 119/2 |
| 3,086,497 | 4/1963 | Novello .................................... 119/2 |
| 3,184,923 | 5/1965 | Galvaing ................................... 61/1 |
| 3,347,029 | 10/1967 | Grinwald .................................. 56/9 |
| 3,534,859 | 10/1970 | Amero et al. ............................. 210/242 |

(List continued on next page.)

FOREIGN PATENT DOCUMENTS

| | | |
|---|---|---|
| 695641 | 8/1953 | Denmark . |
| 0 104 702 | 4/1984 | European Pat. Off. . |
| 2229260 | 12/1974 | France . |
| 480673 | 7/1953 | Italy .......................................... 43/6.5 |

OTHER PUBLICATIONS

International Aquaculture Technologies, "Providing Superior Artemia Through Advanced Technology," RS No. 753.

Packet of advertising literature for the "skim–pak™"device, produced by Douglas Engineering, a Division of U.S. Hydrex, Inc., Walnut Creek, California.

All information contained in the enclosed Information Disclosure Statemaent dated Jul. 30, 1997 from parent application Serial No. 08/760,478.

*Primary Examiner*—Jack W. Lavinder
*Attorney, Agent, or Firm*—Kirton & McConkie; Dale E. Hulse; Berne S. Broadbent

[57] ABSTRACT

Apparatus and methods for harvesting brine shrimp eggs from a body of water involving the use of an elongated member comprising buoyant material which enables the elongated member to float at or near the surface of the body of water and a water-permeable member positioned downwardly from the elongated member so as to enable the water-permeable member to be positioned below the surface of the body of water. The water-permeable member is configured so as to be substantially impermeable to brine shrimp eggs and substantially prevents brine shrimp eggs from escaping harvest as the apparatus is moved through the body of water to collect the brine shrimp eggs. In one presently preferred embodiment, the water-permeable member comprises a porous screen. One or more reinforcement members may also be included to protect the porous screen from tearing, puncture, or other damage.

64 Claims, 11 Drawing Sheets

U.S. PATENT DOCUMENTS

| | | | |
|---|---|---|---|
| 3,539,013 | 11/1970 | Smith | 210/242 |
| 3,541,769 | 11/1970 | Grinwald | 56/9 |
| 3,592,006 | 7/1971 | Crucet | 61/1 |
| 3,604,395 | 9/1971 | Huslin | 119/2 |
| 3,631,679 | 1/1972 | Fisch | 61/1 |
| 3,661,263 | 5/1972 | Peterson et al. | 210/242 |
| 3,669,074 | 6/1972 | Stasio | 119/2 |
| 3,673,986 | 7/1972 | Braunhut | 119/2 |
| 3,678,899 | 7/1972 | Lovitz | 119/2 |
| 3,688,909 | 9/1972 | Titus et al. | 210/242 |
| 3,698,163 | 10/1972 | Kelpin | 56/9 |
| 3,700,108 | 10/1972 | Richards | 210/242 |
| 3,700,109 | 10/1972 | Lasko | 210/242 |
| 3,716,142 | 2/1973 | Bianchi | 210/242 |
| 3,738,316 | 6/1973 | Stasio | 119/2 |
| 3,745,115 | 7/1973 | Olsen | 210/83 |
| 3,748,264 | 7/1973 | McCombie | 210/65 |
| 3,757,953 | 9/1973 | Sky-Eagle, Jr. | 210/242 |
| 3,759,390 | 9/1973 | McCombie | 210/242 |
| 3,762,558 | 10/1973 | Anderson | 210/242 |
| 3,768,193 | 10/1973 | London | 43/6.5 |
| 3,815,751 | 6/1974 | Pavlovic | 210/242 |
| 3,880,624 | 4/1975 | Arnold | 55/242 |
| 3,921,407 | 11/1975 | Neal | 61/1 |
| 3,923,661 | 12/1975 | Crisafulli | 210/242 |
| 3,970,556 | 7/1976 | Gore | 210/83 |
| 3,983,034 | 9/1976 | Wilson | 210/73 |
| 4,006,082 | 2/1977 | Irons | 210/83 |
| 4,019,227 | 4/1977 | Ebata | 24/205.16 R |
| 4,051,038 | 9/1977 | in'tVeld | 210/242 |
| 4,059,962 | 11/1977 | Milgram | 61/1 F |
| 4,073,143 | 2/1978 | Preus | 61/1 F |
| 4,104,884 | 8/1978 | Preus | 61/1 F |
| 4,116,007 | 9/1978 | Stagemeyer et al. | 405/66 |
| 4,117,726 | 10/1978 | McGroddy | 73/421 R |
| 4,124,981 | 11/1978 | Preus | 405/66 |
| 4,146,477 | 3/1979 | Challener | 210/143 |
| 4,175,347 | 11/1979 | Puretic | 43/6.5 |
| 4,205,626 | 6/1980 | Muchmore et al. | 119/3 |
| 4,208,287 | 6/1980 | Brieck | 210/242 S |
| 4,264,444 | 4/1981 | Bronnec | 210/242.3 |
| 4,340,321 | 7/1982 | Maheshwary et al. | 405/66 |
| 4,388,188 | 6/1983 | Morris | 210/242.3 |
| 4,405,458 | 9/1983 | McHugh, Jr. | 210/242.3 |
| 4,434,572 | 3/1984 | Sheldon et al. | 43/6.5 |
| 4,458,621 | 7/1984 | De Clifford | 114/255 |
| 4,511,470 | 4/1985 | Ayroldi | 210/242.3 |
| 4,610,794 | 9/1986 | Tsahalis | 210/776 |
| 4,826,362 | 5/1989 | Hayashi | 406/109 |
| 4,839,062 | 6/1989 | Sanders | 210/776 |
| 4,998,369 | 3/1991 | Lamon | 43/6.5 |
| 5,002,430 | 3/1991 | Smith | 405/66 |
| 5,042,187 | 8/1991 | Bentzley | 43/6.5 |
| 5,071,286 | 12/1991 | Separovich | 405/66 |
| 5,102,540 | 4/1992 | Conradi et al. | 210/232 |
| 5,160,432 | 11/1992 | Gattuso | 210/242.3 |
| 5,165,174 | 11/1992 | Brown, Jr. | 43/6.5 |
| 5,209,005 | 5/1993 | Krager | 43/7 |
| 5,253,953 | 10/1993 | Whidden, Jr. | 405/63 |
| 5,361,528 | 11/1994 | Peacock | 43/6.5 |
| 5,457,908 | 10/1995 | Sanders | 43/6.5 |
| 5,491,922 | 2/1996 | Sanders | 43/6.5 |
| 5,513,462 | 5/1996 | Lamon | 43/6.5 |
| 5,522,674 | 6/1996 | Cooper | 405/63 |
| 5,553,972 | 9/1996 | Bergeron et al. | 405/60 |
| 5,564,448 | 10/1996 | Lincoln | 134/166 |
| 5,566,492 | 10/1996 | Swenson | 43/6.5 |
| 5,580,185 | 12/1996 | Ware | 405/72 |
| 5,660,196 | 8/1997 | Bein | 134/129 |
| 5,688,075 | 11/1997 | Gradek | 405/63 |
| 5,738,036 | 4/1998 | Jones | 114/255 |
| 5,768,820 | 6/1998 | Bentzley | 43/6.5 |
| 5,836,101 | 11/1998 | Tuan | 43/4.5 |
| 5,890,311 | 4/1999 | Willener et al. | 43/4.5- |

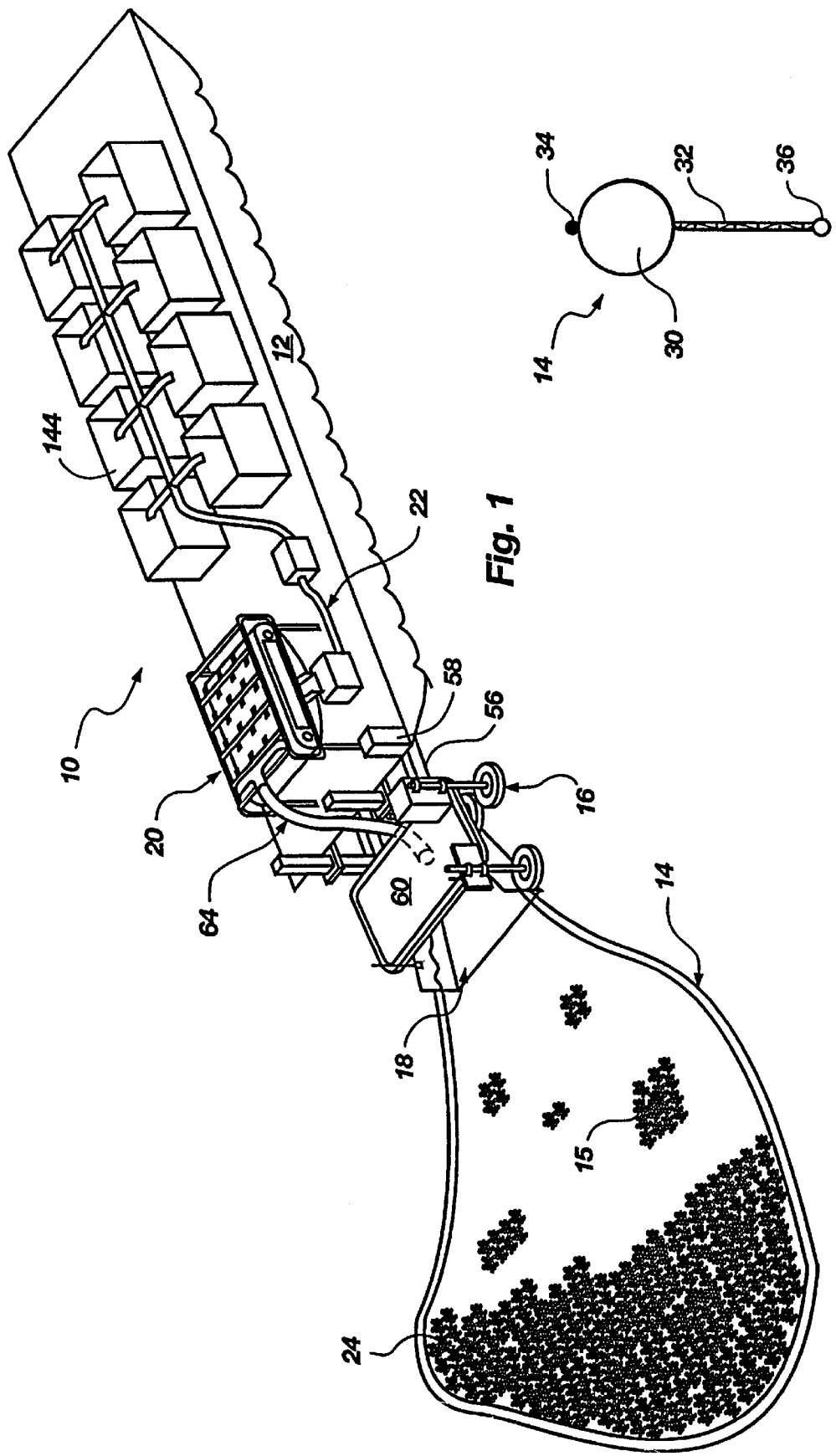

CONTAINMENT BOOM APPARATUS AND METHODS FOR USE IN HARVESTING BRINE SHRIMP EGGS

RELATED APPLICATIONS

This application is a continuation-in-part of application Ser. No. 08/760,478, filed on Dec. 5, 1996, now U.S. Pat. No. 5,890,311, for "APPARATUS AND METHODS FOR HARVESTING AND CLEANING BRINE SHRIMP EGGS," the content of which is incorporated herein by reference; which in turn is a continuation-in-part of provisional application Ser. No. 60/008,323, filed on Dec. 7, 1995 for "APPARATUS AND METHODS FOR HARVESTING AND CLEANING SHRIMP EGGS," the content of which is incorporated herein by reference, and provisional application Ser. No. 60/008,330, filed on Dec. 7, 1995 for "CONTAINMENT BOOM APPARATUS," the content of which is incorporated herein by reference. This application is also a continuation-in-part of application Ser. No. 09/018,157, filed on Feb. 3, 1998, still pending, for "APPARATUS AND METHODS FOR HARVESTING AND CLEANING BRINE SHRIMP EGGS," the content of which is incorporated herein by reference; which in turn is a continuation-in-part of application Ser. No. 08/760,478, filed on Dec. 5, 1996 for "APPARATUS AND METHODS FOR HARVESTING AND CLEANING BRINE SHRIMP EGGS;" which in turn is a continuation-in-part of provisional application Ser. No. 60/008,323, filed on Dec. 7, 1995 for "APPARATUS AND METHODS FOR HARVESTING AND CLEANING SHRIMP EGGS," and provisional application Ser. No. 60/008,330, filed on Dec. 7, 1995 for "CONTAINMENT BOOM APPARATUS."

The priority of each of the foregoing applications is claimed under 35 U.S.C. §119(e) and 35 U.S.C. §120.

FIELD OF THE INVENTION

This invention relates to collecting substances and/or materials from a body of water and, more particularly, to novel systems and methods for harvesting and cleaning brine shrimp eggs on the open water.

BACKGROUND

As classified, brine shrimp are branchiopod crustaceans of the genus Artemia which commonly inhabit strongly saline environments, such as salty lakes and brine pools which exist throughout the world. The Great Salt Lake located in the state of Utah is an example of such a concentrated saline body of water which provides a rich environment where brine shrimp may flourish. One of the predominant species of brine shrimp commonly found in vast numbers on the Great Salt Lake is the species *Artemia salina*.

Measuring on the average of approximately one centimeter in length, brine shrimp primarily feed on free floating algae and other microscopic organisms found in hypersaline lakes and ponds. Typically during natural growth, brine shrimp acquire a shell which develops over a portion of their body and which is generally shed periodically throughout the life cycle of the brine shrimp to allow for additional growth. The shell casings discarded from brine shrimp are then deposited in the surrounding waters and become a part of a conglomeration of floating debris generally contiguous the brine shrimp.

Normally reaching sexual maturity within approximately three weeks after hatching, brine shrimp generally reproduce about every fourth day, which may sometimes last for as long as an eight month period. Brine shrimp eggs (or cysts) are, accordingly, deposited in surrounding waters and become a part of the conglomeration of floating debris generally contiguous the brine shrimp.

In some hypersaline bodies of water, such as the Great Salt Lake, brine shrimp eggs do not hatch during a period of several months of the year, primarily as a result of a period of physiologically enforced dormancy or diapause. In this regard, naturally occurring brine shrimp eggs are usually found with debris floating at or near the surface of a body of water in a mixture which is typically blown by the wind and carried by the water currents to the surrounding shoreline beaches.

Floating in a natural state at or near the surface of the water, brine shrimp eggs are routinely discovered in a mixture consisting, in a large part, of live and dead brine shrimp, discarded brine shrimp shell casings, brine fly casings, wood pieces, tumbleweed, twigs, trash, dead waterfowl, and/or other types of floating debris. After separating the deposited brine shrimp eggs from this mixture of floating debris, the brine shrimp eggs, under examination, typically resemble fine granules of sand as a result of their inherently diminutive size. For example, an ounce of salt water extracted from the Great Salt Lake may contain up to several million brine shrimp eggs.

Historically, the eggs of brine shrimp are collected, cleaned, dried, and packaged for storage so as to provide a general source of commercial fish food. After brine shrimp eggs have been processed, dried, and packaged, even after several years in storage, the eggs may be immersed in salt water for a period of about twenty-four hours and free-swimming larvae will usually emerge due to the tremendous resilience of brine shrimp eggs. Similarly, brine shrimp eggs may be hatched and used as an excellent food source for feeding fish and/or other small aquatic animals in saltwater and/or freshwater aquariums. Because brine shrimp eggs have the capability of being stored for several years as a packaged commodity, brine shrimp eggs have become a valuable resource of commercial fish food which is very much in demand throughout the world. In this regard, newly hatched brine shrimp from brine shrimp eggs provide an excellent food source for growing prawns or other shrimp raised for commercial purposes.

Consistent with the foregoing, those skilled in the art developed techniques and methods to assist in harvesting brine shrimp eggs from the shoreline of a hypersaline body of water. Traditionally, shovels and various netting apparatus were utilized along the shorelines to collect the free-floating mixture of brine shrimp eggs and debris. Shoreline harvesting methods and apparatus of the prior art, however, incorporate many disadvantages. For example, one of the most significant disadvantages associated with prior art shoreline harvesting techniques and methods is the conditions of the harvest being ultimately influenced by the weather in relation to its inherent control as to where, when, and if the brine shrimp eggs are deposited along the shoreline.

Another meaningful disadvantage with regards to shoreline harvesting methods and apparatus of the prior art includes the considerable amount of manual labor typically required to collect a sufficient quantity of brine shrimp eggs from the shoreline utilizing shoveling apparatus and prior art netting devices. Furthermore, a substantial amount of debris is traditionally harvested with the collection of the brine shrimp eggs, thus requiring the addition of numerous filtering and cleaning stages or steps before the brine shrimp eggs are properly processed and prepared for drying, packaging, and storage.

In an attempt to improve the collection output of harvesting brine shrimp eggs using prior art shoreline harvesting methods and devices, several attempts were made by those skilled in the art to develop a way of concentrating the brine shrimp eggs into a smaller, designated area along the shoreline by means of utilizing extensive fencing structures extending substantially outward from the shoreline. These prior art fencing structures were found to be generally expensive and, in addition, the harvesting of the brine shrimp eggs usually required ready access to a substantial amount of shoreline in order to properly position the prior art fencing structures. Even with extensive fencing structures operatively disposed along the shorelines of a body of water, the productivity of prior art shoreline harvesting apparatus and methods for collecting brine shrimp eggs inevitably remained at the uncontrollable mercy of the wind, the weather, and the water currents.

In view of the foregoing disadvantages of prior art shoreline harvesting techniques and methods, those skilled in the art began to integrate the teachings and disclosures of prior art oil-skimming devices and techniques. Consequently, oil-skimming devices of the prior art provided an immediate resource of technology in relation to the techniques and methods developed for removing oil from a body of water by means of incorporating an apparatus for skimming the surface of the water. Prior art oil-skimming apparatus and methods were found to be intimately analogous to the needs realized by those skilled in the art for harvesting brine shrimp eggs from a body of water.

For example, prior art oil-skimming devices may comprise one or more of the following structural and/or functional elements: (1) a means for funneling or directing an accumulation of oil floating at or near the surface of the water into a concentrating assembly; (2) a concentrating assembly comprising a substantially level, horizontal leading edge for skimming the surface of the water, wherein the leading edge may be connected to a mechanism for adjusting the positioning of the leading edge in relation to the surface of the water; (3) an inlet port disposed in operative relation to the concentrating assembly; and (4) a suction pump for pumping the oil and materials collected at the inlet port into a distillation tank or container providing a means for settling the oil from the water as a result of the specific gravity of the oil in relation to the water. Inherently similar in structural design and function, those skilled in the art developed apparatus and methods for use in harvesting brine shrimp eggs which customarily incorporate one or more of the elements of prior art oil-skimming devices, as outlined above.

As a result of the physical characteristics and nature of brine shrimp eggs in relation to oil, those skilled in the art modified the oil skimming technology of the prior art by replacing its distillation tanks with porous container bags. In particular, the replacement of the distillation tanks with one or more porous container bags was generally meant to provide a means for allowing water to filter through the mesh material comprising the porous bags, thereby leaving the collection of live and dead brine shrimp, brine shrimp eggs, discarded brine shrimp shell casings, brine fly casings, wood pieces, trash, tumbleweeds, twigs, dead waterfowl, and/or other types of floating debris within the porous storage bags for transport to an off-water site for processing, cleaning, drying, packaging, and storage.

Although the assimilation of prior art oil-skimming technology for harvesting bring shrimp eggs from a body of water overcomes some of the disadvantages of the prior art shoreline harvesting methods, such brine shrimp egg skimming devices of the prior art still embody several inherent disadvantages and limitations. For example, utilizing a collection assembly supportably disposed in relation to a buoyant frame or watercraft including a structural leading edge for skimming the surface of the water at a general depth of less than 5 cm (2 inches), and more particularly, at a depth of 0.625 cm to 2.5 cm (¼ inch to 1 inch) below the surface of the water, normally requires the buoyant frame to move through the various streams of naturally occurring brine shrimp egg colonies and other floating debris in order to adequately skim the mixture from the surface of the water and deposit the mixture into one or more prior art porous container bags. A meaningful drawback to navigating through these naturally occurring colonies of brine shrimp eggs and floating debris which may cover a significant area of the surface of the body of water generally involves serious inconveniences and an inefficient use of time in relation to overall productivity. In this regard, it typically takes a significant amount of time to sufficiently skim off all the brine shrimp eggs found in a naturally occurring egg streak.

Besides prior art skimming devices for harvesting brine shrimp eggs, other apparatus and methods were developed by those skilled in the art. For example, prior art egg harvesters were developed consisting of a scooping mechanism utilized for removing the free-floating mixture from the water and introducing the collected mixture of live and dead brine shrimp, brine shrimp eggs, discarded shell casings, brine fly casings, pieces of wood, trash, tumbleweeds, twigs, dead waterfowl, and/or other types of floating debris into one or more porous container bags. Traditionally, prior art scooping devices may employ a series of collection members or baskets that are generally capable of being immersed below the surface of the water by means of a rotational conveyor system in order to scoop the mixture from the water.

Prior art scooping devices for harvesting brine shrimp eggs, however, have been found to incorporate several disadvantages. For example, depending on the rotational direction of a supporting conveyor system, the movement of prior art scooping devices through the water typically generate a stirring motion in the water which may encourage the brine shrimp eggs deeper under the surface of the water, thereby making the potential harvest much less efficient and productive. In addition, by means of utilizing a water-permeable collection basket, the water generally drains through the mesh screen comprising the basket and, unfortunately, the brine shrimp eggs have been found to aggregate and adhere to the mesh walls of the collection basket thereby making it difficult to adequately remove all the brine shrimp eggs before the collection basket re-enters the water by way of the rotating conveyor system. Prior art scooping devices for harvesting brine shrimp eggs also customarily incorporate multiple working parts which may facilitate a complicated system of operation and/or method of use. As appreciated in this particular art, economic considerations carry significant weight when dealing with the highly competitive brine shrimping industry, since relatively complicated apparatus and methods are frequently found to be expensive and, likewise, commercially impractical.

In operation, brine shrimp egg harvesting apparatus and methods of the prior art customarily remove a naturally occurring mixture of brine shrimp eggs and debris floating at or near the surface of a body of water and deliver this collected mixture into a storage assembly or one or more container bags preferably formed having a porous construction. Similarly, porous container bags of the prior art may provide a means for water to disperse from the mixture, thereby leaving the collected brine shrimp eggs and debris contained within one or more of the porous bags. A significant amount of unwanted debris remains within the porous container bags intimately intermixed with the brine shrimp eggs. As noted above, the floating debris may include, but is not intended to be limited to, dead and live brine shrimp, discarded brine shrimp shell casings, brine fly casings, pieces of wood, trash, tumbleweeds, twigs, dead waterfowl, and/or other types of floating material. The collected debris, together with the brine shrimp eggs, generally comprise the mixture floating on or at the surface of the water. Historically, prior art porous container bags are filled with this mixture and preferably transported to shore where the collected brine shrimp eggs may be separated from the unwanted debris at a processing plant utilizing a means of removing the unwanted debris and retaining the "clean" brine shrimp eggs for purposes of drying, packaging, and storage.

An inherent disadvantage with collection methods of prior art harvesting apparatus is that one or more sites are required to process and clean the brine shrimp eggs from the unwanted debris for purposes of drying, packaging, and storage before the quality of the egg begins to degrade and spoil. Another serious disadvantage with prior art collection apparatus and methods is that the greater the quantity of the debris collected and retained within the porous container bags, the less the overall quantity of brine shrimp eggs retained contiguously with the unwanted debris within the container bags as a result of the limited internal holding capacity of each bag.

Similarly, the buoyant support frame or watercraft which supports prior art harvesting apparatus may have to unload often due to the inclusion of unwanted debris. Consequently, a substantial amount of time and labor may be required to take one or more boats to shore in order to unload the container bags filled with this mixture of brine shrimp eggs and other floating debris. Multiple trips to shore for off-loading may therefore have a major effect on the overall productivity and economic output of the harvesting operation. Accordingly, the time allocated for actual harvesting of brine shrimp eggs may be adversely affected, if a considerable amount of time is spent traveling to and from the shore for unloading. If prior art brine shrimp egg harvesting equipment is tied up by way of unloading, competitors will, more often than not, have the opportunity to stake valuable claims to the remaining colonies of brine shrimp eggs available on the open water for harvesting.

Efforts have continuously been made in an attempt to more efficiently harvest brine shrimp eggs and remedy many of the above-identified disadvantages. The prior art brine shrimp egg harvesting apparatus and methods discussed herein leave much to be desired from the standpoint of manufacturing costs, simplicity of construction, and effectiveness of operation. Considering all these factors, prior art apparatus and methods for harvesting brine shrimp eggs have also proven to require a significant investment of time and labor in relation to the overall goal of producing a supply of "clean" brine shrimp eggs for subsequent processing, storage, and sale. None of the prior art disclosures suggest or teach the present inventive system or combination of elements for an apparatus and method for harvesting and cleaning brine shrimp eggs on the open water, as herein described and claimed.

BRIEF SUMMARY AND OBJECTS OF THE INVENTION

In view of the foregoing, it is a primary object of the present invention to provide novel apparatus and methods for harvesting and cleaning brine shrimp eggs on the open water.

It is also an object of the present invention to provide apparatus and methods for harvesting and cleaning brine shrimp eggs which comprise a concentration member for surrounding a mixture of naturally occurring brine shrimp eggs and debris floating at or near the surface of a body of water and concentrating this mixture into a concentrated egg-debris mud mixture having a general thickness and compact density of about 7.5 cm to 45 cm (3 inches to 18 inches).

Further, it is an object of the present invention to provide apparatus and methods for harvesting and cleaning brine shrimp eggs which provide a means for separating and removing unwanted debris from a concentrated mixture, whereby "clean" brine shrimp eggs are deposited into one or more porous container bags on a buoyant support frame (e.g., watercraft) while on the open water.

It is a still further object of the present invention to provide apparatus and methods for harvesting and cleaning brine shrimp eggs which comprise a novel containment boom apparatus utilized for encircling, retaining and concentrating one or more floating colonies of brine shrimp eggs and debris into a concentrated egg/debris mud mixture for harvesting, rather than maneuvering a watercraft through a body of water to skim naturally occurring colonies of brine shrimp eggs and debris floating at or near the surface of the water.

In addition, it is an object of the present invention to provide apparatus and methods for harvesting and cleaning brine shrimp eggs which are capable of providing an efficient mode of operation with regards to the time and labor expended by way of: (1) forming a concentrated egg/debris mud mixture so not to waste time skimming and (2) separating the brine shrimp eggs from the unwanted debris of the concentrated egg-debris mud mixture so as to minimize the number of trips to the shore to unload, thus increasing overall productivity.

Moreover, it is an object of the present invention to provide apparatus and methods for harvesting and cleaning brine shrimp eggs which simplifies the harvesting process.

Consistent with the foregoing objects, and in accordance with the invention as embodied and broadly described herein, an apparatus for harvesting and cleaning brine shrimp eggs is disclosed in one preferred embodiment of the present invention as comprising a buoyant support frame (e.g., watercraft) having a collection assembly operably disposed in relation thereto. In preferred operation, a concentration member provides a means for surrounding a mixture of naturally occurring brine shrimp eggs and debris floating at or near the surface of a body of water and concentrating the naturally occurring mixture into a concentrated egg/debris mud mixture having a general thickness of about 7.5 cm to 45 cm (3 inches to 18 inches). As it is retracted, the concentration member facilitates the introduction of the concentrated egg/debris mud mixture of brine shrimp eggs and debris into the collection assembly.

Engageably disposed in relation to the collection assembly, a first extraction apparatus provides a means for transporting the concentrated egg/debris mud mixture introduced within the collection assembly to a filtering/cleaning assembly preferably disposed on board the buoyant support frame. Preferably, the filtering/cleaning assembly separates the brine shrimp eggs from the concentrated egg/debris mud mixture by means of a filtering system, thus providing "clean" brine shrimp eggs. These "clean" brine shrimp eggs may be correspondingly delivered and deposited into one or more porous container bags by means of a delivery system being operatively disposed between the filtering/cleaning assembly and the porous container bags.

One presently preferred method of the present invention for harvesting and cleaning brine shrimp eggs may comprise the following steps of: (1) concentrating a mixture of naturally occurring brine shrimp eggs and debris floating at or near the surface of a body of water into a concentrated egg/debris mud mixture; (2) introducing the concentrated egg/debris mud mixture into a collection assembly; (3) transporting the collected egg/debris mud mixture to a filtering/cleaning assembly; (4) separating the brine shrimp eggs from the unwanted debris of the concentrated egg/mud mixture; and (5) delivering the separated "clean" brine shrimp eggs to at least one porous container bag. The additional step of dewatering the separated brine shrimp eggs before delivery to one or more porous container bags may be further incorporated.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only exemplary embodiments of the invention and are, therefore, not to be considered limiting of its scope, the invention will be described with additional specificity and detail through use of the accompanying drawings in which:

FIG. 1 is a perspective view of an apparatus for harvesting and cleaning brine shrimp eggs in accordance with one presently preferred embodiment of the present invention;

FIG. 2 is a cross-sectional view illustrating one presently preferred embodiment of a concentrating member of one presently preferred embodiment of the apparatus for harvesting and cleaning brine shrimp eggs of the present invention;

DETAILED DESCRIPTION OF THE PREFERRED EMBODIMENTS

Figure 3:
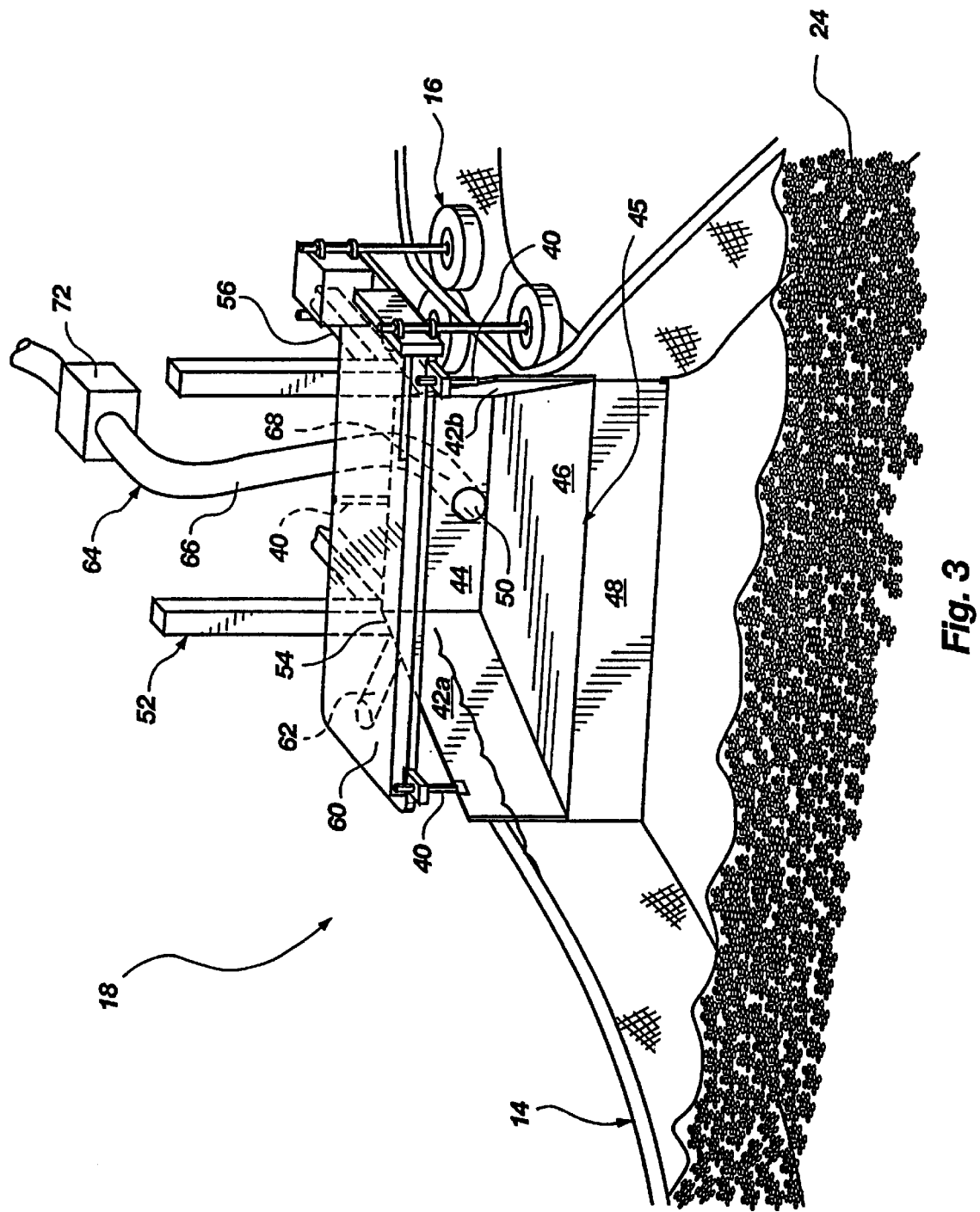
FIG. 3 is a perspective view of one presently preferred embodiment of a collection assembly of one presently preferred embodiment of the apparatus for harvesting and cleaning brine shrimp eggs of the present invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 16, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

One presently preferred embodiment of the present invention, designated generally at 10, is best illustrated in FIG. 1. As shown, an apparatus for harvesting and cleaning brine shrimp eggs 10 preferably comprise a buoyant support frame 12 having a collection assembly 18 and concentration member 14 operably disposed in supportable relation thereto for collecting a mixture 15 of naturally occurring brine shrimp eggs and debris floating at or near the surface of the water and concentrating the mixture 15 into a concentrated egg/debris mud mixture 24 having a general thickness of about 7.5 cm to 45 cm (3 inches to 18 inches). Engageably disposed in relation to the collection assembly 18, a first extraction apparatus 64 provides a means for transporting the concentrated egg/debris mud mixture 24 introduced within the collection assembly 18 to a filtering/cleaning assembly 20. In operation, the filtering/cleaning assembly 20 separates the brine shrimp eggs from the unwanted debris of the concentrated egg/debris mud mixture 24 by means of at least one cleaning screen 82, thereby providing "clean" brine shrimp eggs. The "clean" brine shrimp eggs may be correspondingly delivered to at least one porous container bag 144 by means of a delivery system 22 operably disposed between the filtering/cleaning assembly 20 and one or more porous container bags 144.

The concentration member 14 provides a means for concentrating the mixture 15 of naturally occurring brine shrimp eggs and debris into a concentrated egg/debris mud mixture 24 having a general thickness of about 7.5 cm to 45 cm (3 inches to 18 inches). The concentration member 14 further provides a means for influencing the introduction of the concentrated egg/debris mud mixture 24 into the collection assembly 18. Referring to FIGS. 2 and 3, the concentration member 14 comprises a flexible containment boom apparatus engaging a boom retrieval member 16. The boom retrieval member 16 preferably provides a manual or automated means which facilitates the retrieval of the concentration member 14 from an extended position on a body of water.

In structural relationship, the boom retrieval member 16 is preferably mounted to the platform 60 and its supporting structure. As best illustrated in FIG. 3, the boom retrieval member 16 preferably includes a retrieval of the concentration member 14 from an extended position on a body of water.

In structural relationship, the boom retrieval member 16 is preferably mounted to the collection assembly 18. As best illustrated in FIG. 3, the boom retrieval member 16 preferably includes a retrieval assembly comprising a guide wheel, an engagement wheel, a driving wheel, an axle for each wheel, a support member for each axle, and a hydraulic, mechanical, or electromechanical driving means. In preferred operation, the boom retrieval member 16 provides a means for retaining a portion of the body of the concentration member 14 substantially flush with the front end of the collection assembly 18 to facilitate a means for introducing the concentrated egg/debris mud mixture 24 into the collection assembly 18. It will be readily appreciated to those skilled in the art that other modifications and adaptations for concentrating the mixture 15 of naturally occurring brine shrimp eggs and debris floating at or near the surface of a body of water are possible which are consistent with the spirit and scope of the present invention.

Referring back to FIG. 2, in one presently preferred embodiment of the present invention, the concentration member 14 may comprise a buoyant crown 30, a porous skirt or screen 32, a reeling line 34, and sufficient weighted members 36 disposed in relation to the porous skirt 32 to provide a weighted means for retaining the porous skirt 32 below the surface of the water. Preferably, the crown 30 may be formed of a sufficiently buoyant material to provide a means for sustaining the concentration member 14 from sinking, especially in relation to the disposition of the weighted members 36. As will be readily appreciated by those skilled in the art, any suitable buoyant material and/or variation in the structural design of the concentration member 14 are anticipated by the present invention. For example, the buoyant crown 30 may comprise one or more Styrofoam® pieces preferably housed within a solid covering that provides sufficient structural integrity and support to retain the dimensional shape of the buoyant crown 30. Similarly, those skilled in the art will readily recognize other possible modifications and adaptations of the concentration member 14 which are consistent with the spirit and scope of the present invention.

As further illustrated in FIG. 2, attached to the buoyant crown 30 opposite the connection of the reeling line 34 is the porous skirt 32. The porous skirt 32 preferably comprises a material having a vertically disposed, dimensional length sufficient for being disposed below the surface of the water.

The length of the concentration member 14 may vary from a few hundred feet to a thousand feet or more, depending upon the size needed to surround one or more colonies of naturally occurring brine shrimp eggs and debris floating at or near the surface of a body of water. Correspondingly, the vertical depth of the porous skirt 32 of one presently preferred embodiment of the concentration member 14 may be disposed below the surface of the water from a few inches to several feet. In one presently preferred embodiment of the present invention, the vertical depth of the porous skirt 32 preferably extends from about 15 cm to about 210 cm (about 6 inches to about 84 inches) below concentration member 14 at the surface of the water, more preferably from about 90 cm (about 36 inches) to about 185 cm (about 72 inches), and most preferably about 150 cm (about 60 inches). As will be appreciated, the relative dimensions of the concentration member 14 and the porous skirt 32 can, of course, vary dependent upon the proportional size of the material or substances being harvested from the water.

In the novel construction of one presently preferred embodiment of the present invention, the porous skirt 32 is preferably formed of a water-permeable material which is inherently impermeable to the passage of brine shrimp eggs and/or other larger debris. In this regard, the porous skirt 32 comprises a mesh size of about 200 microns or less, more preferably about 160 microns or less, and most preferably within the range of from about 80 microns to about 150 microns. Although mesh sizes greater than 200 microns could be employed, in the case of brine shrimp eggs, some egg will begin to be lost as the egg may pass through such larger mesh sizes. Although mesh sizes smaller than the preferred range of from about 80 microns to about 150 microns could be employed, such smaller mesh sizes present greater drag resistance as the porous skirt 32 is moved through the water. Thus, the ideal mesh size is one that will capture the maximum amount of egg (or other material being harvested) with the minimal amount of drag resistance. Since the mesh size of the porous skirt 32 of the present invention should generally be slightly less than the dimensional size of the material or substance being concentrated, it is anticipated that the mesh size may be varied in order to accommodate different collection uses.

In operation, the water-permeability of the porous skirt 32 preferably provides a means for reducing the amount of water collected by the concentration member 14. Thus, the characteristics of the porous skirt 32 facilitate a means for easily passing the skirt through the water in which it floats, while retaining the mixture 15 of naturally occurring brine shrimp eggs and other larger debris and forming a concentrated egg/debris mud mixture 24 disposed within the boundaries of the concentration member 14.

Figure 13:
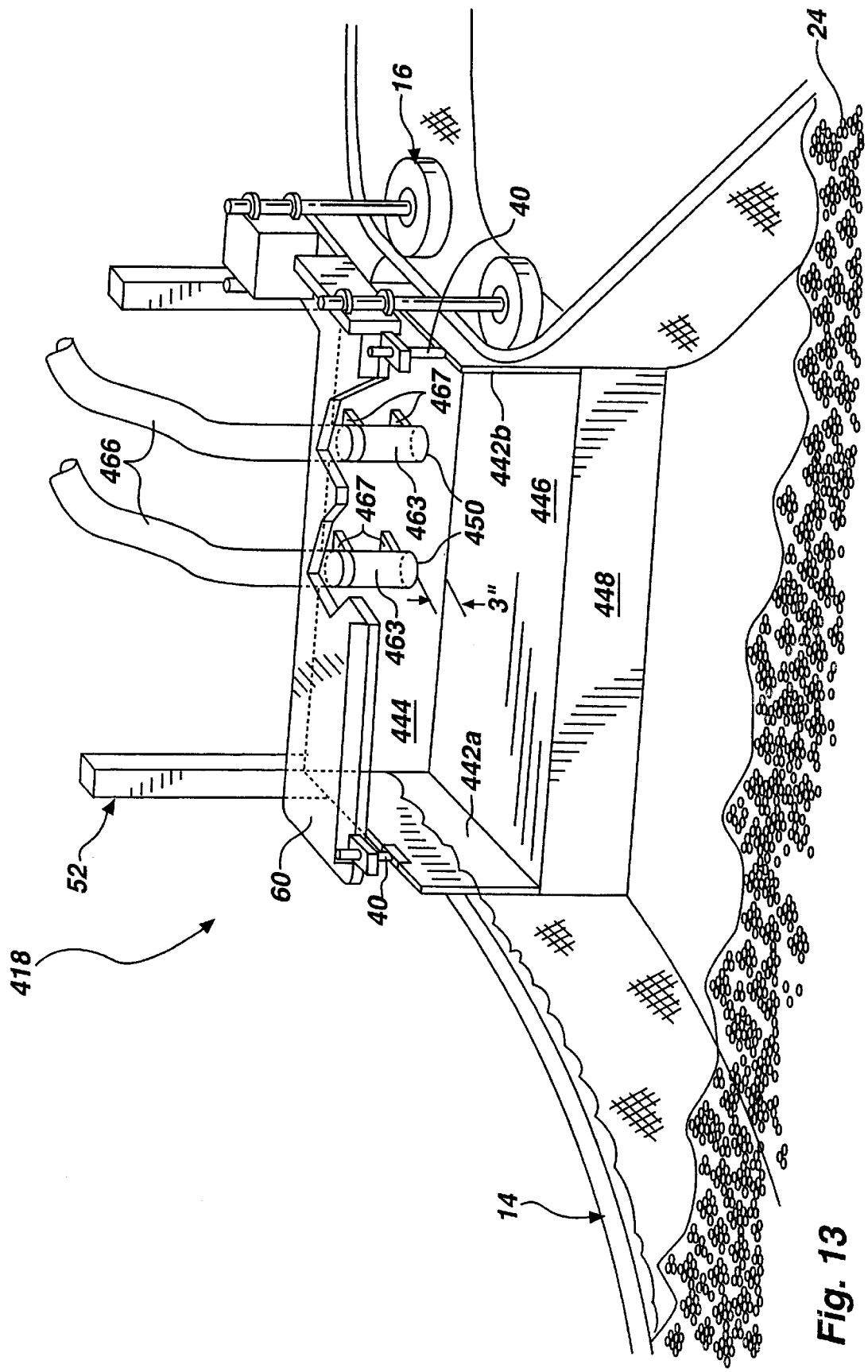
FIG. 13 is a perspective view of another alternative presently preferred embodiment of a collection assembly of the apparatus for harvesting and cleaning brine shrimp eggs.
Figure 14:
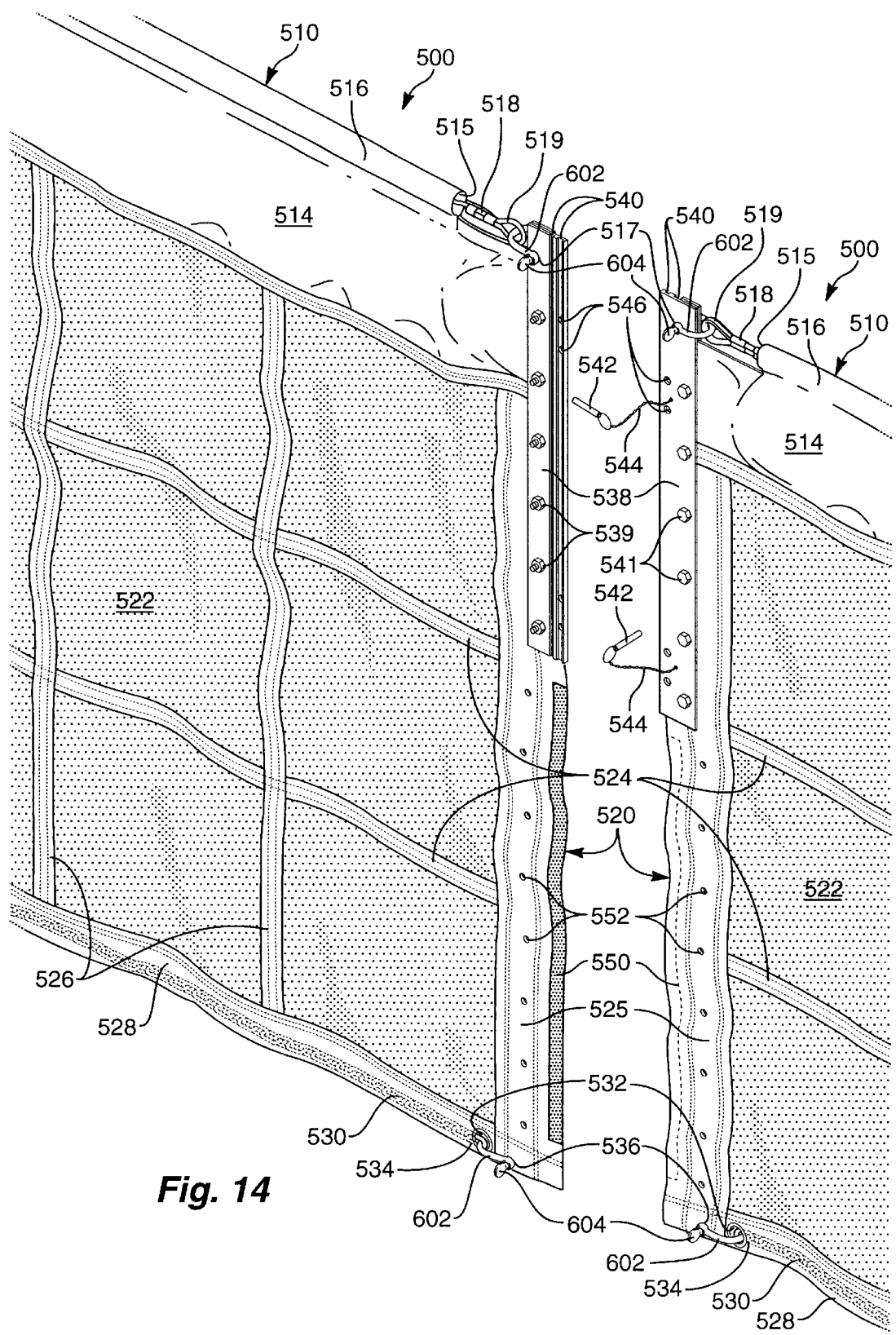
FIG. 14 is a perspective view of one presently preferred embodiment of an apparatus within the scope of the present invention for harvesting brine shrimp eggs from a body of water comprising an elongated member having buoyant material and a water-permeable member positioned downwardly therefrom.
Figure 15:
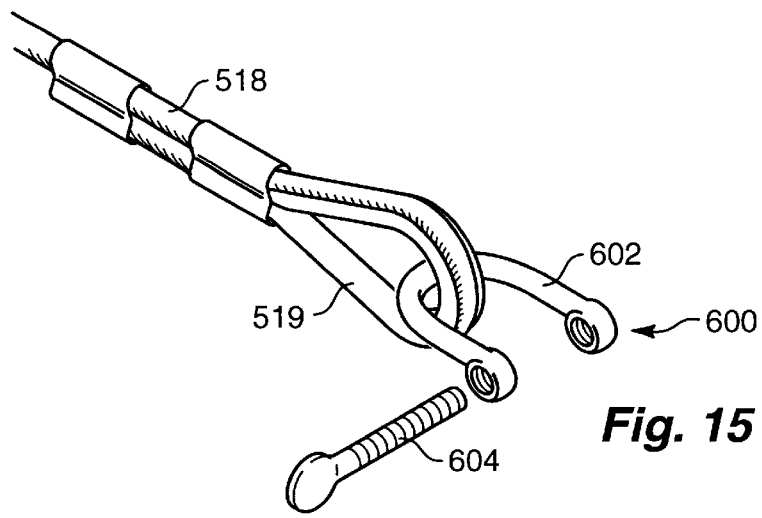
FIG. 15 is a perspective view of one presently preferred embodiment of a locking mechanism which may be used in connection with a cable and/or weighted member employed with an apparatus such as shown in FIG. 14.
Figure 16:
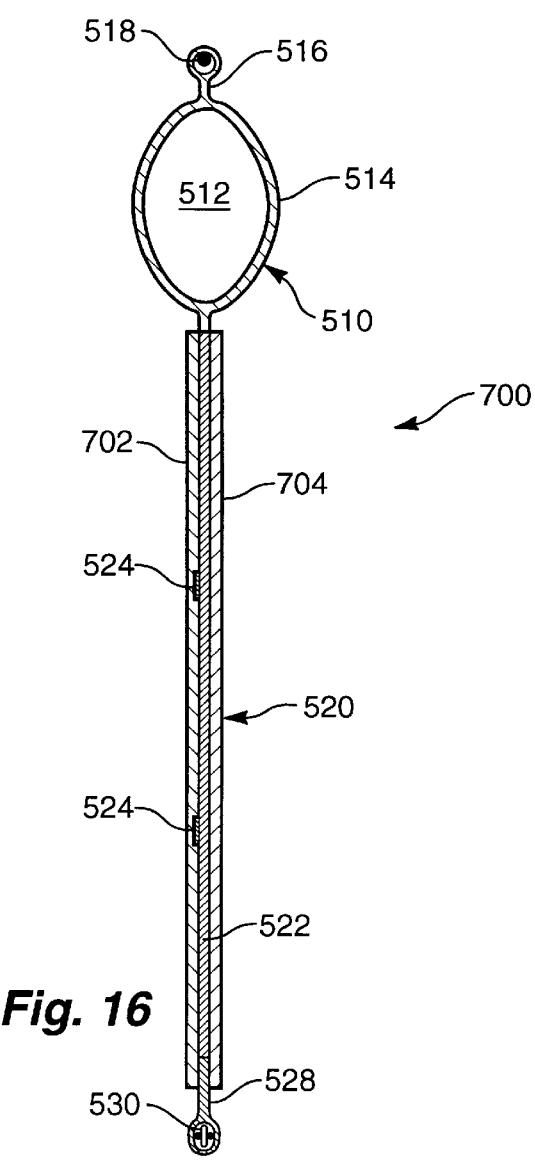
FIG. 16 is a cross-sectional view of a second presently preferred embodiment of an apparatus within the scope of the present invention following the spirit of the apparatus shown in FIG. 14 with the addition of two reinforcing members being positioned around the water-permeable member.

Alternative presently preferred embodiments of the concentration member of the present invention, generally designated 500 and 700, are shown in FIGS. 14–16. The concentration members of FIGS. 14–16 have been modified from the concentration member 14 shown in FIGS. 1–3, but may be substituted for concentration member 14 in the apparatus and methods for harvesting brine shrimp eggs as disclosed herein. Thus, the disclosure herein which describes the employment of concentration member 14 in the operation of the brine shrimp egg harvesting/cleaning apparatus and methods of the present invention (for example, as described with respect to FIGS. 1–13) also applies to the alternative presently preferred embodiments of concentration members 500 and 700 newly illustrated in FIGS. 14–16.

One presently preferred alternative embodiment of a concentration member or apparatus for harvesting brine shrimp eggs from a body of water is generally designated 500 in FIG. 14. (Note that the opposite ends of apparatus 500 are shown in fragmented fashion in FIG. 14 so as to show the configuration of both ends. These ends are shown as though apparatus 500 had been formed into a circular shape solely for purposes of illustrating both ends. This will also provide the reader with a better understanding of how two apparatus 500 may be connected together, since the left and right fragments of apparatus 500 shown in FIG. 14 could also represent two separate apparatus 500 which are to be joined together.) As seen in FIG. 14, apparatus 500 includes an elongated member generally designated 510 and a water-permeable member generally designated 520.

Elongated member 510 includes an elongated core 512 which is made of buoyant material (see FIG. 16 for elongated buoyant core 512) and which enables elongated member 510 to float at or near the surface of the body of water, preferably on the surface of the body of water. Elongated member 510 preferably also includes a covering 514 positioned around buoyant core 512.

Elongated member 510 may be referred to as a "containment boom", which containment boom has been modified as disclosed herein for the purpose of harvesting brine shrimp eggs. Much in the same fashion as concentration member 14 illustrated in FIGS. 1–3, elongated member or containment boom 510 can be placed so as to encircle a plurality of brine shrimp eggs and thereby harvest the same by continually closing the loop formed by elongated member or containment boom 510.

The buoyant material within buoyant core 512 may be made of any suitable buoyant material. Presently preferred materials for buoyant core 512 include synthetic resinous materials, for example, polypropylene or polystyrene (for example, that polystyrene which is sold under the registered trademark Styrofoam®). In one presently preferred embodiment, core 512 is made of a closed cell polypropylene foam.

Although any suitable material may be used for cover 514 of elongated member 510, polyvinyl chloride is used in one presently preferred embodiment, which polyvinyl chloride may be modified, if desired, so as to contain a plasticizer. Another material which also may be used to fashion cover 514 is polyurethane. In one presently preferred embodiment of the present invention, cover 514 includes a nylon or polyester substrate upon which polyvinyl chloride (with or without the plasticizer) is coated.

One presently preferred elongated member 510 or containment boom which may be used in connection with the present invention is available from Kustom Environmental Products, Tulsa, Okla., and includes a buoyant core 512 made of closed cell polypropylene foam with a cover 514 made of polyvinyl chloride modified to contain a plasticizer which is coated on a scrim of nylon or polyester. Such elongated member or containment boom has been found to work well in connection with the present invention.

As further seen in FIG. 14, a flap 516 is formed on the top side of elongated member 510 so as to be contiguous with cover 514. In this regard, flap 516 is preferably formed from the same material as cover 514. Flap 516 also preferably includes a hollow cavity for housing a cable 518 (for example, a steel cable). As will be appreciated, cable 518 and flap 516 facilitate manipulation of the containment boom apparatus 500.

As best shown in FIG. 14, in one preferred embodiment of the present invention, an opening 515 is formed in one end of flap 516 so as to expose a portion of cable 518 and allow cable 518 to be locked in place. In this regard, a locking mechanism 600 (shown in FIG. 15) is provided to secure the exposed portion of cable 518 in place.

As best shown in FIG. 15, locking mechanism 600 includes a U-shaped member 602 having female threads at the end of each end of the "U" and an elongated screw 604 having male threads for engaging the female threads of U-shaped member 602. Thus, as shown in FIG. 14, U-shaped member 602 may be inserted through an end loop 519 formed at the end of cable 518, and then, elongated screw 604 may be threaded through one end of U-shaped member 602, through a hole 517 formed in a connecting member 538 (which will be described in more detail hereinafter), and then through the other end of U-shaped member 602. After such insertion, an enclosure is formed between U-shaped member 602 and elongated screw 604 so as to effectively lock cable loop end 519, 21 and thus cable 518, in place.

Referring once again to FIG. 14, it may be seen that water-permeable member 520 is positioned downwardly from elongated member 510 so as to enable water-permeable member 520 to be positioned below the surface of the body of water. Importantly, although permeable to water, water-permeable member 520 is configured so as to be substantially impermeable to brine shrimp eggs.

In one presently preferred embodiment, water-permeable member 520 comprises a porous screen material 522. In this regard, it is important that porous screen material 522 have a mesh size which renders the porous screen material 522 substantially impermeable to brine shrimp eggs. In one presently preferred embodiment, water-permeable member 520 or porous screen 522 is sewn directly to the bottom portion of boom cover 514.

Water-permeable member 520 thus functions to allow water to pass through water-permeable member 520, while collecting all brine shrimp eggs and any matter or debris associated with the brine shrimp eggs which is larger than the eggs. When formulating the porous screen material 522 illustrated in FIG. 14, any suitable material can be employed. For example, a polymeric material, such as nylon or polyester can be used to fashion porous screen 522. One particular porous screen material 522 which has been found useful in connection with the present invention is Nitex™ screen material which is a nylon mesh material available, for example, from LACO Industrial Inc., Salt Lake City, Utah. For example, a Nitex™ nylon mesh material having a mesh size of about 140 microns has been found useful in forming porous screen 522.

As mentioned, it is important that the mesh size of the porous screen material 522 be at least slightly less than the size of the brine shrimp eggs to be harvested. In this regard, in the harvest of brine shrimp eggs, the porous screen material 522 preferably comprises a mesh size of about 200 microns or less, more preferably about 160 microns or less, and most preferably within the range of from about 80 microns to about 150 microns. Although mesh sizes greater than about 200 microns may be employed, some brine shrimp egg will begin to be lost as the mesh size is increased beyond about 200 microns. Although mesh sizes smaller than the most preferred range of from about 80 microns to about 150 microns could be employed, such smaller mesh sizes present greater drag resistance as the porous screen material 522 is moved through the water. Thus, the ideal mesh size is one that will capture the maximum amount of brine shrimp eggs with the minimal amount of drag resistance. By minimizing drag resistance, the porous skirt material 522, and thus water-permeable member 520, may be moved through the body of water at a faster rate. This is desirable from the standpoint of minimizing harvest time.

It will thus be understood that the upper limit of the mesh size of porous screen 522 is much more important in the practice of the present invention than the lower limit of the mesh size. As stated, it is important that the upper limit of the mesh size be such that brine shrimp eggs cannot significantly pass therethrough, otherwise, valuable harvest will be lost. On the other hand, as long as the mesh size is such that brine shrimp eggs cannot significantly pass therethrough, the lower limit for the mesh size is not as important.

Since the mesh size selected is such that the porous screen 522 is substantially impermeable to brine shrimp eggs, it will also be impermeable to most of the debris also associated with brine shrimp eggs, and will allow the eggs and debris to be gathered together to form a concentrated egg/debris mud mixture as disclosed herein. Once formed, such concentrated egg/debris mud mixture may be collected, for example, by one or more of the different collection assemblies disclosed herein and, if desired, may be processed all the way to clean egg as shown, for example, in the general harvesting and cleaning method and process illustrated in FIG. 1 herein.

Typically, most brine shrimp eggs are naturally located at or near the surface of the body of water. However, with the movement of watercraft through the water, or with the movement of elongated member 510, some brine shrimp eggs can be drawn to significant depths below the surface of the body of water. Thus, water-permeable member 520 serves to capture brine shrimp eggs which are below the surface of the water. In this regard, in one presently preferred embodiment of the present invention, the vertical depth of water-permeable member 520 preferably extends from about 15 cm (about 6 inches) to about 210 cm (about 84 inches) below the surface of the water, more preferably from about 90 cm (about 36 inches) to about 185 cm (about 72 inches), and most preferably about 150 cm (about 60 inches).

In selecting the appropriate vertical depth for water-permeable member 520, there are two important considerations. First, the vertical depth of water-permeable member 520 is preferably great enough to capture substantially all of the brine shrimp eggs desired to be harvested. Second, the vertical depth of the water-permeable member 520 is preferably not so great as to create undesirable drag resistance as water-permeable member 520 is moved through the body of water. Thus, if the brine shrimp eggs to be harvested are not mixed to significant depths in the water, a shorter water-permeable member 520, for example, from about 15 cm (about 6 inches) to about 45 cm (about 18 inches), may be more desirable for such situations so as to minimize the drag resistance and speed up the harvesting process.

As further illustrated in FIG. 14, in one presently preferred embodiment, a plurality of reinforcing strips 524 and 526 may be applied to porous screen material 522 so as to provide additional strength to porous screen 522. In this regard, one or more horizontal reinforcing strips 524 and a plurality of vertical reinforcing strips 526 may be sewn directly onto porous screen 522 for this purpose. Obviously, the nature and number of the reinforcing strips 524 and 526 provided depends upon the additional strength which is desired to be imparted to porous screen 522. In this regard, fewer (or no) reinforcing strips than shown in FIG. 14 may be employed, while additional reinforcing strips could be added if found necessary or desirable.

Preferably, reinforcing strips 524 and 526 are constructed of a substantially stronger material than porous screen 522. In this regard, in one presently preferred embodiment, reinforcing strips 524 and 526 are constructed of substantially the same material as covering 514 for elongated member 510. Hence, reinforcing strips 524 and 526 may be made from any suitable material, such as polyvinyl chloride (which may or may not be modified by the addition of a plasticizer) or polyurethane. In one presently preferred embodiment, reinforcing strips 524 and 526 comprise polyvinyl chloride (which has been modified to include a plasticizer) which is coated on either a nylon or polyester substrate. One presently preferred material which is available for fashioning reinforcing strips 524 and 526 comprising polyvinyl chloride modified to include a plasticizer which is coated on a nylon or polyester fabric is available from Kustom Environmental Products, Tulsa, Okla.

Referring once again to FIG. 14, in another presently preferred embodiment, one or more wider reinforcing strips 525 are applied to the vertical ends of porous screen 522 to further reinforce porous screen 522. Reinforcing strips 525 are preferably made from the same material as reinforcing strips 524 and 526, but are wider in dimension than vertical reinforcing strips 526. It has been found that by applying wider reinforcing strips 525 towards the ends of porous screen 522, important additional strength is supplied to porous screen 522. Once again, however, it will be appreciated that the use of wider reinforcing strips 525 is optional, and may be employed in the present invention as needed to provide the proper strength to porous screen 522.

In FIG. 14, reinforcing strips 524, 525, and 526 are shown as being applied to one side of porous screen 522. It will be understood, however, that reinforcing strips such as reinforcing strips 524, 525, and 526 may be applied to both sides of porous screen 522 to provide additional strength, if desired.

Referring still to FIG. 14, in one presently preferred embodiment, a flap 528 is sewn along a bottom edge of porous screen 522. Flap 528 is preferably constructed of the same material as cover 514 and reinforcing strips 524 and 526. Hence, flap 528 may be constructed of polyvinyl chloride (which may or may not be modified to include a plasticizer) or polyurethane or any other suitable material. In one presently preferred embodiment, flap 528 comprises polyvinyl chloride modified by the addition of a plasticizer which is coated onto a nylon or polyester fabric. Again, such material is available, for example, from Kustom Environmental Products, Tulsa, Okla.

Preferably, flap 528 has a hollow cavity therein for housing a weighted member 530 which is illustrated by dashed lines in FIG. 14. The weighted member 530 within the cavity formed within flap 528 serves to provide weight to the bottom edge of porous screen 522 so as to keep porous screen 522 more vertical when moved through the body of water.

Weighted member 530 may take a variety of forms. In one presently preferred embodiment, weighted member 530 is a chain, for example, a metal chain which provides weight along the bottom edge of porous screen 522. By providing such weight at the bottom of porous screen 522 and keeping porous screen 522 more vertical when moved through the body of water, the possibility of brine shrimp eggs escaping under the bottom edge of porous screen 522 and flap 528 is minimized.

As shown in FIG. 14, a hole 532 formed in flap 528 by a grommet therein, is provided so as to provide an opening in flap 528, thereby exposing an end loop 534 of weighted member or chain 530. A locking mechanism is further provided for securing end loop 534 of weighted member or chain 530 in place. Although the locking mechanism for weighted member or chain 530 can take a variety of forms, in the embodiment shown in FIG. 14, the locking mechanism for weighted member or chain 530 is identical to the locking mechanism 600 shown in FIG. 15 which is used to secure end loop 519 of cable 518 in place. Hence, as seen in FIG. 14, to secure weighted member or chain 530 in place, U-shaped member 602 is inserted through hole 532 and end loop 534 of weighted member or chain 530, and then, elongated screw 604 is threaded through one end of U-shaped member 602, through a hole 536 formed along the bottom end of widened reinforcing strip 525, and then through the other end of U-shaped member 602. After such insertion, an enclosure is formed between U-shaped member 602 and elongated screw 604 so as to effectively lock end loop 534, and hence weighted member or chain 530, in place.

Again, the locking mechanism 600 disclosed herein for both cable 518 and weighted member or chain 530 is merely illustrative of one possible locking mechanism for preventing undesirable movement of cable 518 or weighted member or chain 530 within their respective flaps 516 and 528. As will be appreciated by those skilled in the art, many other locking mechanisms besides the locking mechanism 600 shown in FIG. 15 may be employed to accomplish this purpose.

Referring again to FIG. 14, in one presently preferred embodiment, a connecting member 538 is secured along one or both ends, preferably both ends, of apparatus 500, for example, by a plurality of nuts 539 and bolts 541. Although connecting member 538 may be formed of various materials, in one presently preferred embodiment, each connecting member 538 is formed of metal, for example, aluminum metal. As seen in FIG. 14, each connecting member 538 preferably includes one or more grooves 540 which are capable of engaging one or more corresponding grooves 540 of another connecting member 538 so as to allow for two or more of apparatus 500 to be connected together.

As seen in FIG. 14, if desired, one or more locking pins 542, each secured by a chain 544 to connecting member 538 may be used, if desired, to further secure two adjoining apparatus 500. To accomplish such, one or more holes 546 is provided in each connecting member 538 of adjoining apparatus 500. Once the corresponding grooves 540 of adjoining connecting members 538 have been engaged, the holes 546 of the two connecting members 538 are aligned, and each locking pin 542 is inserted through such aligned holes 546 in adjoined connecting members 538. In addition, if desired, each locking pin 542 may be spring-loaded so as to further secure the connection between the adjoined connecting members 538 and their respective apparatus 500.

Referring still to FIG. 14, if desired, further connecting mechanisms may be employed to further secure the lower portion of two apparatus 500 to be adjoined. In this regard, complementary strips 550 of VELCRO® hook and loop fastening material may be provided along the corresponding edges of the widened reinforcing strips 525 of two apparatus 500 to be joined. (Note that the strip 550 of VELCRO® fastening material on the right hand side of FIG. 14 is shown in dashed lines since it is located on the other side of widened reinforcing strip 525 facing away from the viewer.) By providing one of VELCRO® strips 550 in FIG. 14 with hooks, and the other VELCRO® strip 550 with loops, the two strips 550 may be adjoined together to fasten together the lower portion of two apparatus 500, and permit the subsequent separation thereof as desired.

FIG. 14 illustrates yet another connecting mechanism which may be employed (either instead of or in addition to VELCRO® strips 550) to further secure the lower portion of two apparatus 500 to be adjoined. In this regard, a series of holes 552 may be provided in each widened reinforcing strip 525 so as to allow the insertion of a lacing material (now shown) therethrough. Thus, such lacing material may be woven through sequential holes 552 of two apparatus 500 so as to lace those two apparatus 500 together.

If desired, instead of using a lacing material, nuts and bolts (not shown) may be used to secure the lower portion of two apparatus 500. In such embodiment, the holes 552 of adjacent apparatus 500 would preferably be placed a bit differently than shown in FIG. 14 so as to line up with each other during connection of the two apparatus 500. (For example, holes 552 may be placed at corresponding positions along each of VELCRO® strips 550.) A bolt may then be placed through two such corresponding holes of adjoining apparatus 500, and a nut placed thereon to secure the bolt in place.

Still another connecting mechanism (not shown) which may be used in connection with the present invention is to employ connecting members similar to those designated 538 in FIG. 14, but extend each connecting member further down the edge of widened reinforcing strip 525, for example, to substantially the bottom of apparatus 500. In this regard, if desired, such connecting members may extend the entire vertical height of apparatus 500 from the top thereof (as shown in FIG. 14), to the bottom of widened reinforcing strip 525, so as to be vertically adjacent flap 528. In addition, instead of a single length of connecting member to run the vertical height of the edge of apparatus 500, two lengths of connecting member (not shown), one on top, one on bottom, could be employed if desired.

Again, the foregoing connecting mechanisms are merely illustrative, and it will be appreciated by those skilled in the art that many other connecting mechanisms may be used in connection with the present invention so as to enable a plurality of apparatus 500 (or apparatus 700 to be discussed in more detail hereinafter with respect to FIG. 16) to be connected together as desired or needed. In this regard, depending upon the size of the streak containing the brine shrimp eggs which is to be harvested, the harvester must decide how long of a harvesting apparatus is needed. Hence, by enabling a plurality of apparatus 500 or 700 to be connected together, the harvester can select the appropriate length of the harvesting apparatus for any given situation.

Practical lengths for each apparatus 500 or 700 within the scope of the present invention have been found to be about 100 feet, although certainly shorter or longer lengths may be employed as needed or desired. Hence, the harvester can choose the appropriate number of 100 foot lengths of apparatus 500 or 700, or other appropriate lengths, and connect such apparatus together so as to obtain the total length desired for the particular streak of brine shrimp eggs and situation given.

Reference is now made to FIG. 16 wherein an alternative preferred embodiment of the containment boom or apparatus for harvesting brine shrimp eggs from a body of water is illustrated and generally designated 700. Apparatus 700 is constructed identically to apparatus 500, with the sole exception of the addition of reinforcement members 702 and 704. As shown in FIG. 16, a first reinforcement member or screen 702 and a second reinforcement member or screen 704 are preferably positioned around porous screen 522 such that porous screen 522 is positioned between reinforcement members 702 and 704. Reinforcement members or screens 702 and 704 may be secured to apparatus 700, for example, by sewing the reinforcement members 702 and 704 to the bottom portion of boom cover 514. In this regard, if desired, the same stitching can be used to secure both reinforcement members 702 and 704 and porous screen 522 to the bottom portion of boom cover 514.

A major purpose and function of reinforcement members 702 and 704 is to provide structural protection and reinforcement for porous screen 522 so as to prevent porous screen 522 from becoming torn, punctured, or otherwise damaged. Hence, first reinforcement member 702 and second reinforcement member 704 are preferably constructed so as to have substantially greater strength than porous screen 522. In one presently preferred embodiment, such greater strength is accomplished not by using a different material to construct first reinforcement member 702 and second reinforcement member 704 than is used to construct porous screen 522, but by using a greater thickness of the same material.

Hence, like porous screen 522, first reinforcement member 702 and second reinforcement member 704 may preferably be constructed of a polymeric material, for example, nylon or polyester. In one presently preferred embodiment, first reinforcement member 702 and second reinforcement member 704 are formed from a nylon mesh material. One example of such nylon mesh material which may be used in connection with the present invention for fashioning first reinforcement member 702 and second reinforcement member 704 is Nitex™ nylon mesh material available, for example, from LACO Industrial Inc., Salt Lake City, Utah. In such embodiment, it is presently preferred to employ a thicker Nitex™ nylon mesh material for reinforcement members 702 and 704 than for porous screen 522. Clearly, other suitable materials could be used to fashion one or more reinforcement members such as reinforcement members 702 and 704 in accordance with the present invention.

Another difference between the mesh material which is used to fashion porous screen 522 and reinforcement members 702 and 704 is the mesh size employed. In this regard, both first reinforcement member 702 and second reinforcement member 704 preferably have a mesh size substantially greater than that of porous screen 522. In particular, first reinforcement member 702 and second reinforcement 704 preferably each have a mesh size of at least about 400 microns, more preferably at least about 500 to 600 microns or greater.

As mentioned previously herein, the upper limit of the mesh size of porous screen 522 is quite important, since the mesh size of porous screen 522 must be small enough so that water-permeable porous screen 522 is substantially impermeable to brine shrimp eggs. Thus, the upper limit on the mesh size of porous screen 522 is quite important so as not to lose brine shrimp eggs therethrough, while the lower mesh size of porous screen 522 is less important, as it relates to the drag resistance between porous screen 522 and the water as explained hereinbefore.

When selecting an appropriate mesh size for the mesh material of reinforcement members 702 and 704, the mesh size is much less important than for porous screen 522. In this regard, since the reinforcement members 702 and 704 serve primarily to provide protection and reinforcement support for porous screen 522, a larger mesh size can be used without concern as to the passage of brine shrimp eggs through reinforcement members 702 or 704. In other words, it is not important to select a mesh size for reinforcement member 702 or 704 which is small enough to prevent the passage of brine shrimp eggs, and in fact, mesh sizes which are large enough to pass brine shrimp eggs have been found to be useful and preferable in fashioning reinforcement member 702 or 704.

Thus, the upper limit for the mesh size of reinforcement member 702 or 704 is not that important. Clearly, as the mesh size increases, the drag resistance of reinforcement members 702 and 704 decreases. Hence, in selecting an appropriate mesh size for reinforcement members 702 and 704, those skilled in the art will appreciate that strength and reinforcement are important factors to be considered, as well as the materials employed which also contribute to the overall strength and protection afforded by reinforcement members 702 and 704.

Similarly, the lower limit for the mesh size of reinforcement member 702 or 704 is not that important. Although it is presently preferred to employ a mesh size for reinforcement member 702 or 704 which will allow for the passage of brine shrimp eggs therethrough, smaller mesh sizes may be employed, if desired, that will enable reinforcement member 702 or 704 to capture brine shrimp eggs.

It will be appreciated that one or more reinforcing strips (the same as or similar to reinforcing strips 524, 525, and 526 which are used to strengthen porous screen 522) may also be applied to one or both of reinforcement members 702 and 704, if desired, to provide additional strength thereto. In this regard, such reinforcing strips may be fashioned from the same or similar material as reinforcing strips 524, 525, and 526, and may be sewn directly to reinforcement member 702 and/or reinforcement member 704 as desired.

In another preferred embodiment of the present invention (not shown), instead of applying reinforcing strips 524, 525, and 526 directly to porous screen 522 as shown in FIGS. 14 and 16, a sandwich configuration of a reinforcement member 702, a porous screen 522, and a reinforcement member 704 is first formed along the same lines as the sandwich configuration shown in FIG. 16, and then a single set of reinforcing strips (the same as or similar to reinforcing strips 524, 525, and 526) are positioned along the exterior side of the sandwich configuration (for example, along the outwardly facing side of reinforcement member 702), and then such set of reinforcing strips is sewn to the entire sandwich configuration so as to sew all these materials together. In such embodiment, the layers of material may be sewn together, for example, in the following order: reinforcing strip (such as reinforcing strip 524, 525, or 526)/ reinforcement member 702/porous screen 522/ reinforcement member 704. Clearly, there are many other ways reinforcing strips could be applied to one or more elements of water- permeable member 520 in accordance with the present invention so as to provide additional strength thereto.

Further, it will be appreciated that, although two reinforcement members 702 and 704 are illustrated in the preferred embodiment shown in FIG. 16, the present invention is not limited to the use of two such reinforcement members. Hence, in certain applications where apparatus 500 of FIG. 14 is constructed so as to provide adequate strength in and of itself, it may not even be necessary or desirable to include a reinforcement member such as reinforcement member 702 or 704 as included in apparatus 700. Further, one reinforcement member could be employed rather than two. Moreover, if desired, more than two reinforcement members could be employed as desired. At present, it is preferable in the practice of the present invention to employ at least one reinforcement member as disclosed herein, and more preferably to employ two such reinforcement members.

One reason for the present preference of employing one or two reinforcement members in connection with the porous screen 522 of the present invention is the presently felt need to protect porous screen 522 from tear, puncture, or other damage in view of the materials which have been used up to the present date in forming porous screen 522. It is believed, however, that other materials may provide a stronger porous screen 522 which may be used by itself without the need for protection by any reinforcement members. From the standpoint of simplicity, such would be greatly preferred.

In this regard, there are other materials which show significant promise in fashioning a strong porous screen 522 which requires no other protection or reinforcement members. These other materials have not yet been sufficiently tested, but show significant promise, and are believed to be useful in fashioning a porous screen 522 for use in the present invention. In this regard, the following two nylon mesh materials available from National Filter Media, Salt Lake City, Utah, are believed to have significant promise and to be useful: (1) Stock No. 154026300, having about a 120 micron mesh size, about a 5 oz/yd$^2$ basis weight, and about a 157×35 (per inch$^2$) nylon thread count; and (2) Stock No. 154057200 (nylon twill weave), having about a 5.7 oz/yd$^2$ basis weight, and about a 152×62 (per inch$^2$) nylon thread count (mesh size not presently known).

The present invention also relates to methods for using apparatus such as apparatus 500 or apparatus 700 as shown in FIGS. 14–16 in a method of harvesting brine shrimp eggs from a body of water. In such a method, the elongated member 510 of apparatus 500 or 700 is positioned at or near the surface of the body water such that water-permeable member 520 is positioned downwardly from elongated member 510. The elongated member 510 and water-permeable member 520 are then moved through the water so as to collect brine shrimp eggs associated with the body of water. Such may be accomplished, for example, in accordance with the methods and procedures also disclosed herein with respect to FIGS. 1–13.

The water-permeable member 520 of the present invention, preferably including porous screen 522, provides a number of substantial advantages and benefits in the art of harvesting brine shrimp eggs. One of the primary benefits of water-permeable member 520 is the ability to gather the eggs in a streak of brine shrimp eggs at a much faster rate. In this regard, if a conventional prior art containment boom is employed to harvest brine shrimp eggs (which containment boom does not have a water-permeable member pending therefrom in accordance with the present invention), there is the danger that brine shrimp eggs could escape under or around the sides of such containment boom. Hence, in the prior art, once a streak of brine shrimp eggs has been located and a conventional containment boom is used to encircle such streak of brine shrimp eggs, the loop formed thereby must be very slowly withdrawn so as to attempt to minimize the amount of egg lost under or around the containment boom as the brine shrimp eggs and associated debris are gathered and concentrated into a mud.

With the present invention, on the other hand, the concentration boom or apparatus 500 or 700 may be retracted much more rapidly to create such concentrated mud of brine shrimp eggs and debris, since water-permeable member 520 substantially prevents brine shrimp eggs from escaping under or around the containment boom while retracting the containment boom apparatus at a substantially faster rate. The net result is that brine shrimp eggs can be harvested at a much faster rate, thereby providing a significant competitive edge.

Advantageously, because water-permeable member 520, preferably including for example porous screen 522, is water-permeable, such rapid harvesting of the brine shrimp eggs is facilitated by allowing water to pass through the water-permeable member 520 (for example, porous screen 522) while the brine shrimp eggs are being collected. As will be appreciated, prior art containment booms and methods employing containment boom materials and/or components which are not water-permeable do not provide such benefits, advantages, and opportunities for faster harvest.

In this regard, some prior art containment booms include a solid flap that may extend downwardly from the boom as much as 18 inches. Such a solid flap is not water permeable, and thus additional water is collected as such prior art boom is withdrawn, significantly slowing down the boom retraction, and thus, the harvesting process. This disadvantage is magnified when rain falls on the saline body of water from which the brine shrimp eggs are to be harvested. In such instance, a stratification of fresh water on top of the saline body of water occurs, and the fresh water resists admixture with the saline water below. Hence, when the boom is retracted to concentrate the brine shrimp eggs and associated debris, the fresh water on the surface is also concentrated into a smaller area and exerts significant pressure on the boom, the fresh water continuing to resist downward movement which would mix it with the saline water below. When a solid flap extends downwardly from the boom in the prior art as described above, there is no escape for the fresh water which is being continually concentrated, and the building pressure exerted on the boom by such concentrated fresh water becomes substantial. The net result is that the retraction of the boom, and thus, the harvesting process, is greatly slowed and impeded.

With the water-permeable member 520 of the present invention which is positioned below the boom, this problem is greatly resolved, since water-permeable member 520 allows such fresh water to escape therethrough as the boom is being retracted and as the fresh water is being concentrated. Thus, by providing an escape route for the fresh water, the water-permeable member of the present invention substantially relieves pressure build up against the boom and permits the harvesting process to be conducted at a significantly faster rate.

A further significant advantage of the water-permeable member 520 of the present invention is the ability it provides the harvester to harvest brine shrimp eggs in adverse weather conditions when the wind and waves present obstacles to an effective harvest. In this regard, in rough waters, the brine shrimp eggs can become dispersed to significant depths below the surface of the water. By using water-permeable member 520 which can extend downwardly to any desired depth for given conditions, such brine shrimp eggs are recovered and are not lost to harvest due to the inclement conditions.

Another significant advantage and benefit of the present invention employing a water-permeable member 520 is the ability to use apparatus 500 or 700 to encircle a streak of brine shrimp eggs and hold the streak of brine shrimp eggs in place for harvesting at a later time. In this regard, in the art of harvesting brine shrimp eggs, it is often desirable to form a "wrap" around a located streak of brine shrimp eggs so as to stake a claim to that streak of brine shrimp eggs, even though the harvester is not prepared at that moment to harvest the same. By using apparatus 500 or 700 with water-permeable member 520 as disclosed herein, such apparatus 500 or 700 may be wrapped around such streak of brine shrimp eggs, and then the two ends of the apparatus 500 or 700 fastened together, so as to completely surround that streak of brine shrimp eggs.

Advantageously, in such a "wrap", water-permeable member 520 substantially prevents brine shrimp eggs from escaping from under or around elongated member 510 of the containment boom while the streak of brine shrimp eggs awaits harvest. This is especially important in view of the fact that external forces such as the wind and waves may otherwise cause some brine shrimp eggs to be lost while awaiting harvest. The water-permeable member 520 of the present invention thus provides an effective means for wrapping an existing streak of brine shrimp eggs and holding it in place until harvest can be accomplished at a later time. Once again, this provides a significant competitive advantage.

Referring now back to FIG. 1, the collection assembly 18 may be supportably disposed in relation to the buoyant support frame 12. In structural design, the buoyant support frame 12 preferably supports the collection assembly 18 for placement into and subsequent removal from a body of water. As illustrated in one presently preferred embodiment of the apparatus for harvesting and cleaning brine shrimp eggs 10, the buoyant support frame 12 preferably comprises a water craft. Alternatively, the buoyant support frame 12 may be structurally independent of a watercraft, while providing a separate buoyant means sufficient for supporting the collection assembly 18 in relation thereto when floating in a body of water.

Referring now to FIG. 3, the collection assembly 18 may be formed comprising at least two opposing sidewalls 42*a*, 42*b* disposed in spaced-apart relationship and being substantially parallel to each other, a back wall 44, and an L-shaped panel 45 having a first member 46 and a second member or lip 48. In structural relationship, the second member 48 preferably extends substantially perpendicular to the disposition of the first member 46. As illustrated, the two opposing side walls 42*a*, 42*b*, the back wall 44, and the L-shaped panel 45 are contiguously disposed in relation to each other, thus forming a collection pan assembly having an open end opposite the back wall 44. The open end opposite the back wall 44 provides an opening which facilitates the introduction of the concentrated egg/debris mud mixture 24 within the internal periphery of the collection assembly 18, as defined by its structural components.

In preferred construction, the two opposing side walls 42*a*, 42*b*, the back wall 44, and the L-shaped panel 45 of the collection assembly 18 are formed of a sufficiently rigid, solid material. For example, the structural components of the collection assembly 18 may be comprised of a suitable metal or metal alloy having the general qualities and characteristics of being significantly immutable to deterioration which can be caused as a result of the continuous immersion in a hypersaline environment, as to which the present invention is preferable operated. It will be readily appreciated by those skilled in the art, however, that other suitable materials, such as, wood, fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, foamed, or laminated, or any other suitable composite materials are readily possible which are consistent with the spirit and scope of the present invention.

In structural relationship to the buoyant support frame 12, the collection assembly 18 may be supported by one or more support members 40 engaging a platform 60 as best illustrated in FIG. 3. As will be readily appreciated, the disposition of the collection assembly 18 in relation to the platform 60 may include a removable or fixed supportable engagement there-between. Providing a means for sustaining one or more persons and/or other objects, the platform 60 may be supportably disposed adjacent the collection assembly 18 by means of one or more platform support braces 62. Further, the collection assembly 18 and the platform 60 may be adjustably disposed in relation to the surface of the water by means of incorporating a conventional lift assembly 52.

In one presently preferred embodiment of the present invention, the lift assembly 52 consists of one or more lift supports 56 rigidly attached to the buoyant support frame 12 (e.g., watercraft) and operatively disposed in such a manner so as to provide a means for horizontally supporting the platform 60 and the collection assembly 18 attached thereto. Preferably, the lift assembly 52 is disposed at an end substantially opposite the driving or propulsion system of the buoyant support frame 12. The lift assembly 52 may be supported by at least one structural coupling 54 which engages the platform 60, to which the collector assembly 18 may be fixed or removably attached, to provide a means for vertically adjusting the platform 60 and the collection assembly 18 in relation to the buoyant support frame 12 and the surface of the body of water.

In operation, the lift assembly 52 preferably comprises a conventional hydraulic system which includes a means for vertically adjusting the collection assembly 18 and the platform 60 in relation to the water. As shown in FIGS. 1 and 3, the control assembly 58 for the lift assembly 52 may be positioned approximate the front end of the buoyant support frame 12 to provide an operator with a means for adjusting the height of the collection assembly while maintaining the ability to visualize the harvesting process. As will be appreciated by those skilled in the art, any suitable hydraulic, manual mechanism, or electro-mechanical device may be utilized in relation to the lift assembly 52 of the present invention, thus providing a means for selectively raising and/or lowering the collection assembly 18 in relation to the water.

As will be readily acknowledged by those skilled in the art, the platform 60 is not essential to the functionality of the present invention. Accordingly, one or more persons and/or objects may be disposed in other appropriate positions or locations, such as, for example, on board the buoyant support frame 12, without detracting from the general benefits and advantages of the presently preferred embodiments of the apparatus for harvesting and cleaning brine shrimp eggs 10 of the present invention. If such an alternate embodiment was implemented, in that the collection assembly 18 is not disposed in supportable relation to the platform 60, the collection assembly 18 may be directly disposed in an adjustable relationship to the lift assembly 52 which preferably provides a means for facilitating the vertical adjustment of the collection assembly 18 in relation to the water.

Figure 4:
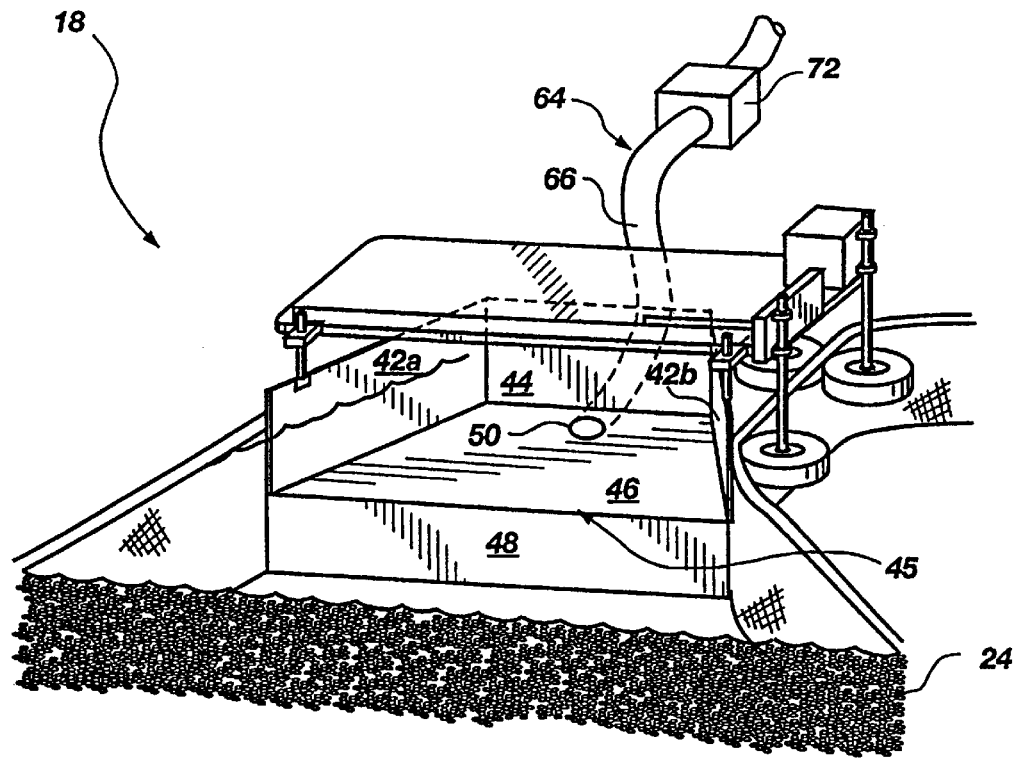
FIG. 4 is a perspective view of another presently preferred embodiment of a collection assembly of one presently preferred embodiment of the apparatus for harvesting and cleaning brine shrimp eggs of the present invention.
Figure 5:
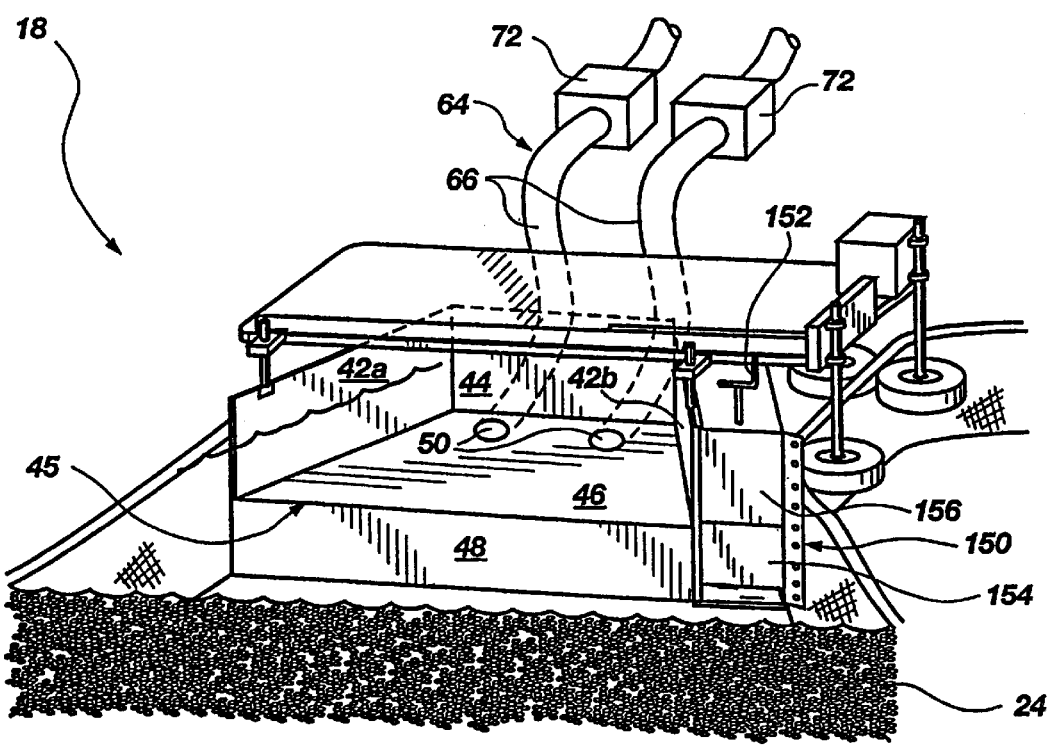
FIG. 5 is a perspective view of yet another presently preferred embodiment of a collection assembly of one presently preferred embodiment of the apparatus for harvesting and cleaning brine shrimp eggs of the present invention, illustrating one presently preferred embodiment of a by-pass flow mechanism.

As discussed above, the second member or lip 48 of the L-shaped panel 45 of the collection assembly 18 is preferably formed of a substantially solid, rigid material. In one presently preferred embodiment of the apparatus for harvesting and cleaning brine shrimp eggs 10 of the present invention, the second member or lip 48 is disposed in a substantially perpendicular relationship to the first member 46, as best illustrated in FIGS. 3, 4 and 5. In preferred operation, the second member 48 of the L-shaped panel 45 may be disposed below the surface of the water by means of the lift assembly 52 such that, in combination with the dimensional length of the porous skirt 32 of one presently preferred embodiment of the concentration member 14, a dimensional boundary may be established for surrounding the concentrated egg/debris mud mixture 24 of brine shrimp eggs and debris.

In operation, the first member 46 of the L-shaped panel 45 is disposed just below the concentrated egg/debris mud mixture 24. In this regard, the first member 46 of the L-shaped panel 45 is preferably disposed below the surface of the water at a general depth of about 7.5 to 45 cm (3 inches to 18 inches), thereby being consistent with the general thickness of the concentrated egg/debris mud mixture 24. Similarly, on the average, the first member 46 of the L-shaped panel 45 is preferably disposed below the surface of the water at a general depth of about 15 cm to 20 cm (6 inches to 8 inches), thus corresponding to the average thickness of the concentrated egg/debris mud mixture 24 before being introduced into the collection assembly 18.

As realized in accordance with one presently preferred embodiment of the present invention, the dimensional boundary as defined by the porous skirt 32 of the concentration member 14 and the second member 48 of the L-shaped panel 45 of the collection assembly 18 may not be wholly uniform in that the porous skirt 32 is preferably water-permeable, while the second member 48 is preferably formed having a substantially impermeable, solid construction being substantially equivalent to the structure of the side walls 42 and the back wall 44. In this regard, the impermeability of the second member 48 of the L-shaped panel 45 significantly restricts the passage of the concentrated egg/debris mud mixture 24, thus providing a means for restricting the concentrated egg/debris mud mixture 24 from readily passing beneath the buoyant support frame 12 (e.g., watercraft), as best shown in FIG. 1.

Consistent with the foregoing, when the concentrated egg/debris mud mixture 24 approaches a thickness and compact density of about 30 cm to 45 cm (12 inches to 18 inches) or more, it may sometimes be difficult to position the first member 46 of the L-shaped panel 45 completely under the concentrated egg/debris mud mixture. In such instance, the second member or lip 48 of the L-shaped panel 45 serves to corral the concentrated egg/debris mud mixture 24 for subsequent collection by the collection assembly 18 so that a portion of the concentrated egg/debris mud mixture 24 is not lost under the buoyant support frame 12 (e.g., watercraft).

As can be appreciated, the presently preferred embodiment of the collection assembly 18 of the apparatus for harvesting and cleaning brine shrimp eggs 10 of the present invention cannot be functionally utilized as a form of skimming device, as a result of the disposition of the second member 48 of the L-shaped panel 45 of the collection assembly 18. In particular, the substantially perpendicular disposition of the second member 48 of the L-shaped panel 45 in relation to the first member 46 would frustrate the functionality of a skimming device by creating torrents of water that would dissipate the mixture 15 of naturally occurring brine shrimp eggs and debris further beneath the surface of the water, thereby encouraging the mixture out of a collectable range for effectuating a productive harvest.

As can be further appreciated, the apparatus for harvesting and cleaning brine shrimp eggs 10 of the present invention may incorporate various alternate means for collecting and concentrating a mixture of naturally occurring brine shrimp eggs and debris and introducing the concentrated egg/debris mud mixture into a collection assembly for delivery to the filtering/cleaning assembly 20 for the separation of the brine shrimp eggs from the egg/debris mud mixture. It is intended, therefore, that the preferred embodiments of the collection assembly 18 as provided herein be viewed as exemplary of the collection principles of the present invention, and not as necessarily restrictive to a particular structure for implementing those principles.

In one presently preferred embodiment of the collection assembly 18 of the present invention, an opening 50 may be integrally formed in the back wall 44, as illustrated in FIG. 3. The opening 50 is preferably formed having an internal periphery sufficient for allowing the concentrated egg/debris mud mixture 24 to pass therethrough. In preferred operational design of the present invention, at least one opening 50 is formed in the back wall 44 of the collection assembly 18 and may be relatively disposed below the surface of the water.

Referring to FIG. 4, an opening 50 may be integrally formed in the first member 46 of the L-shaped panel 45 of an another presently preferred embodiment of the collection assembly 18. The opening 50 formed in the first member 46 preferably comprises an internal periphery being sufficient for allowing the concentrated egg/debris mud mixture 24 to pass there-through. In this presently preferred embodiment, at least one opening 50 is formed in the first member 46 of the collection assembly 18. In this regard, it will be readily appreciated by those skilled in the art, that more than one opening 50 may be disposed in the first member 46 of the collection assembly 18. In this regard, it will be readily appreciated by those skilled in the art, that more than one opening 50 may be disposed in the first member 46 of the L-shaped panel 45. For example, the collection assembly 18 of an alternate preferred embodiment of the present invention may comprise two openings 50 disposed in the first member 46 of the L-shaped panel, as shown in FIG. 5. Consistent with the foregoing, it is contemplated by the present invention that one or more openings may be formed in the back wall 44, the first member 46 of the L-shaped panel 45, and/or in either or both of the side walls 42a, 42b.

Referring to FIGS. 3, 4 and 5, the opening or openings 50 formed in relation to the collection assembly 18 are designed to provide fluid communication with a first extraction apparatus 64 engageably disposed in connection therewith. Functionally, the opening or openings 50 formed in the collection assembly 18 provide a means for focusing the concentrated egg/debris mud mixture 24 into a first end 68 of an extraction tube 66 of a first extraction apparatus 64, whereby the concentrated egg/debris mud mixture 24 may be pumped from the collection assembly 18 to a filtering/ cleaning assembly 20. It will be appreciated by those skilled in the art that since the dimensional size and shape of the opening or openings 50 formed in the collection assembly 18 will vary according to the dimensional size and shape of the material or substances being collected, it is anticipated that different shapes and sizes of the openings 50 are possible such that to accommodate the passage of various materials or substances.

In yet another presently preferred embodiment of the present invention as illustrated in FIG. 5, the apparatus for harvesting and cleaning brine shrimp eggs 10 may incorporate a bypass flow mechanism 150 engageably disposed in relation to the collection assembly 18. In preferred structure, the bypass flow mechanism 150 may comprise a stationary member 156, an openable gate 154, and a flow adjustment member 152 that provides a means for adjusting the openable gate 154 in relation to the fixed member 156 to allow a portion of the concentrated egg/debris mud mixture 24 to flow through the open passageway formed as a result thereof, thereby reducing the concentration of the live and dead brine shrimp which can be generally found below the level of buoyant brine shrimp eggs. In addition, the openable gate 154 may be adjusted in such a manner so as to release fresh water. As shown, the stationary member 156 is preferably formed having a dimensional height which substantially corresponds to the dimensional height of the adjoining side wall 42. Similarly, the openable gate 154 of the bypass flow mechanism 150 is preferably formed having a dimensional height that substantially corresponds to the dimensional height of the adjoining second member 48 of the L-shaped panel 45.

In preferred construction, the bypass flow mechanism 150 is formed of a sufficiently rigid, solid material. For example, the structural components of the bypass flow mechanism 150 may be comprised of a suitable metal or metal alloy having the general qualities and characteristics of being significantly immutable to deterioration which can be caused as a result of the continuous immersion in a hyper-saline environment, as to which the present invention is preferably operated. It will be readily appreciated by those skilled in the art, however, that other suitable materials, such as, wood, fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, foamed, or laminated, or any other suitable composite materials are readily possible which are consistent with the spirit and scope of the present invention.

In operation, the openable gate 154 may be disposed in a first position by means of the flow adjustment member 152 thereby allowing a portion of the concentrated egg/debris mud mixture 24 to flow therethrough. Moreover, the openable gate 154 may be disposed in a second position by means of the flow adjustment member 152. In the second position, the openable gate 154 acts as an extension of the second member 48 of the L-shaped panel 45, thus providing a means for restricting the passage of the concentrated egg/debris mud mixture 24 beneath the buoyant support frame (e.g., watercraft). As can be appreciated, those skilled in the art will readily recognize other possible modifications and adaptations for regulating a bypass flow of the concentrated egg/debris mud mixture 24 which are consistent with the spirit and scope of the present invention.

Figure 8:
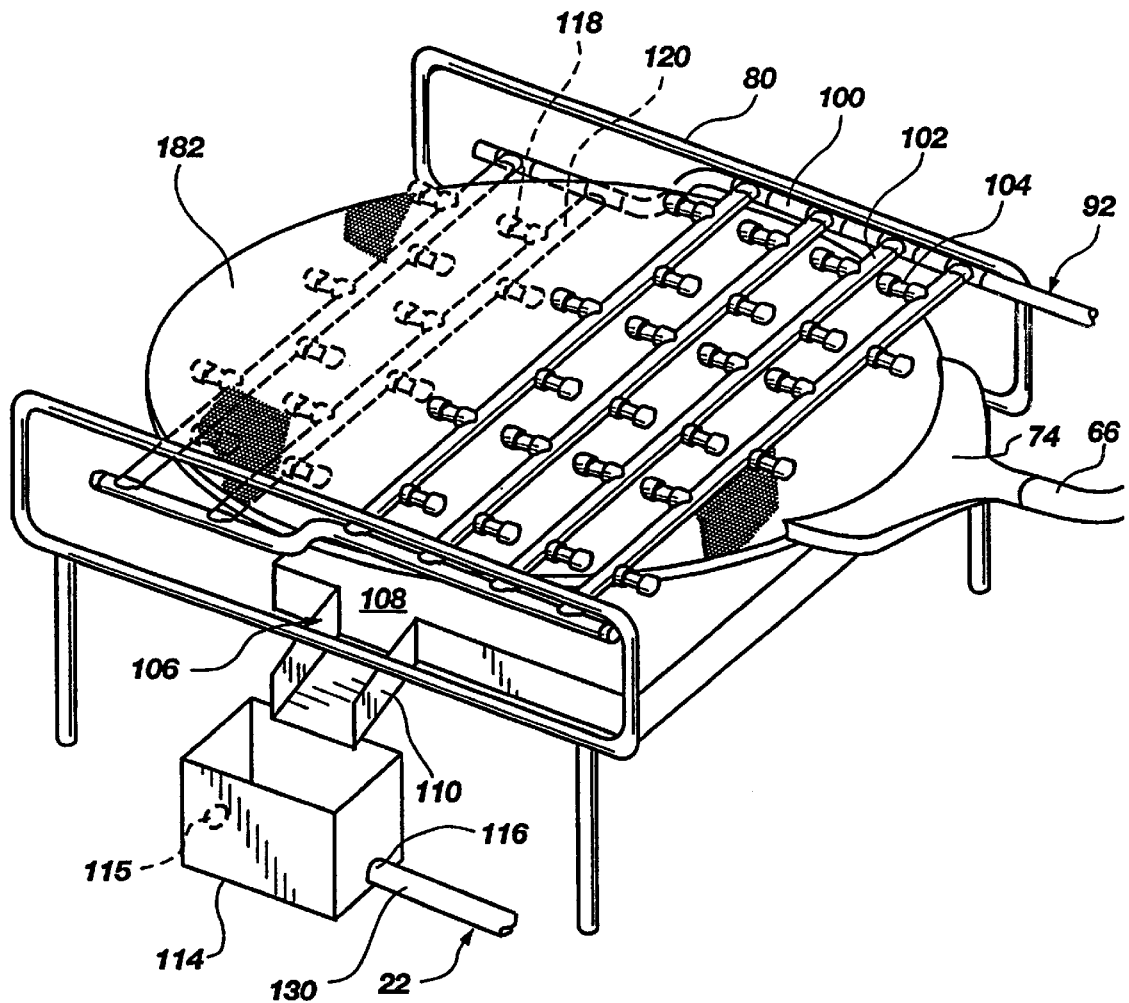
FIG. 8 is a perspective view of another presently preferred embodiment of the cleaning screen of one presently preferred embodiment of the filtering/cleaning assembly of one presently preferred embodiment of the apparatus for harvesting and cleaning brine shrimp eggs of the present invention.

As noted above, the first extraction apparatus 64 comprises an extraction tube 66 and a collection pump 72. the extraction tube 66 includes a first end 68, a second opposing end 70, and an intermediate portion disposed therebetween. Preferably, the extraction tube 66 is engageably disposed between the opening 50 formed in the collection assembly 18 and the filtering/cleaning assembly 20. In operation, the collection pump 72 provides a delivery means having sufficient capacity for transporting the concentrated egg/debris mud mixture 24 from the collection assembly 18 to the filtering/cleaning assembly 20 by way of the extraction tube 66, as best illustrated in FIGS. 1, 3, 4, and 5. In addition, as evidenced for example by referring to FIG. 6, the second end 70 of the extraction tube 66 preferably engages a delivery guide 74 disposed in relation to the first end 76 of the filtering/cleaning assembly 20. In preferred operation, the delivery guide 74 provides a means for dispensing the concentrated egg/debris mud mixture 24 substantially across the dimensional width of a cleaning screen 82 of the filtering/cleaning assembly 20, as best depicted in FIGS. 6 and 8.

In preferred structure, the delivery guide 74 may be formed having an elongated, substantially conical shape for dispersing the concentrated egg/debris mud mixture 24 across its distal end. Further, the delivery guide 74 includes a mounting member for engaging the filtering/cleaning assembly 20 and a delivery port for engaging the second end 70 of the extraction tube 66 thus providing fluid communication therebetween, as shown in FIGS. 6 and 7. In an alternate preferred embodiment, the delivery guide 74 may comprise a substantially elongated, flat surface area having a plurality of internal spacers formed therein for dispersing the concentrated egg/debris mud mixture 24 across its distal end. It will be readily appreciated, however, that other shapes and/or configurations of the delivery guide 74 are possible.

In one presently preferred embodiment of the present invention, the delivery guide 74 may be formed of a sufficiently sturdy material. For example, the delivery guide 74 may be formed of a suitable metal or metal alloy having the general qualities and characteristics of being significantly immutable to deterioration which can be caused as a result of continuous immersion in a hypersaline environment, as to which the present invention is preferably operated. It will be readily appreciated by those skilled in the art, however, that other suitable materials, such as, wood fiberglass, graphite, ceramic, any of the numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, formed, or laminated, or any other suitable composite materials are readily possible which are consistent with the spirit and scope of the present invention.

Figure 6:
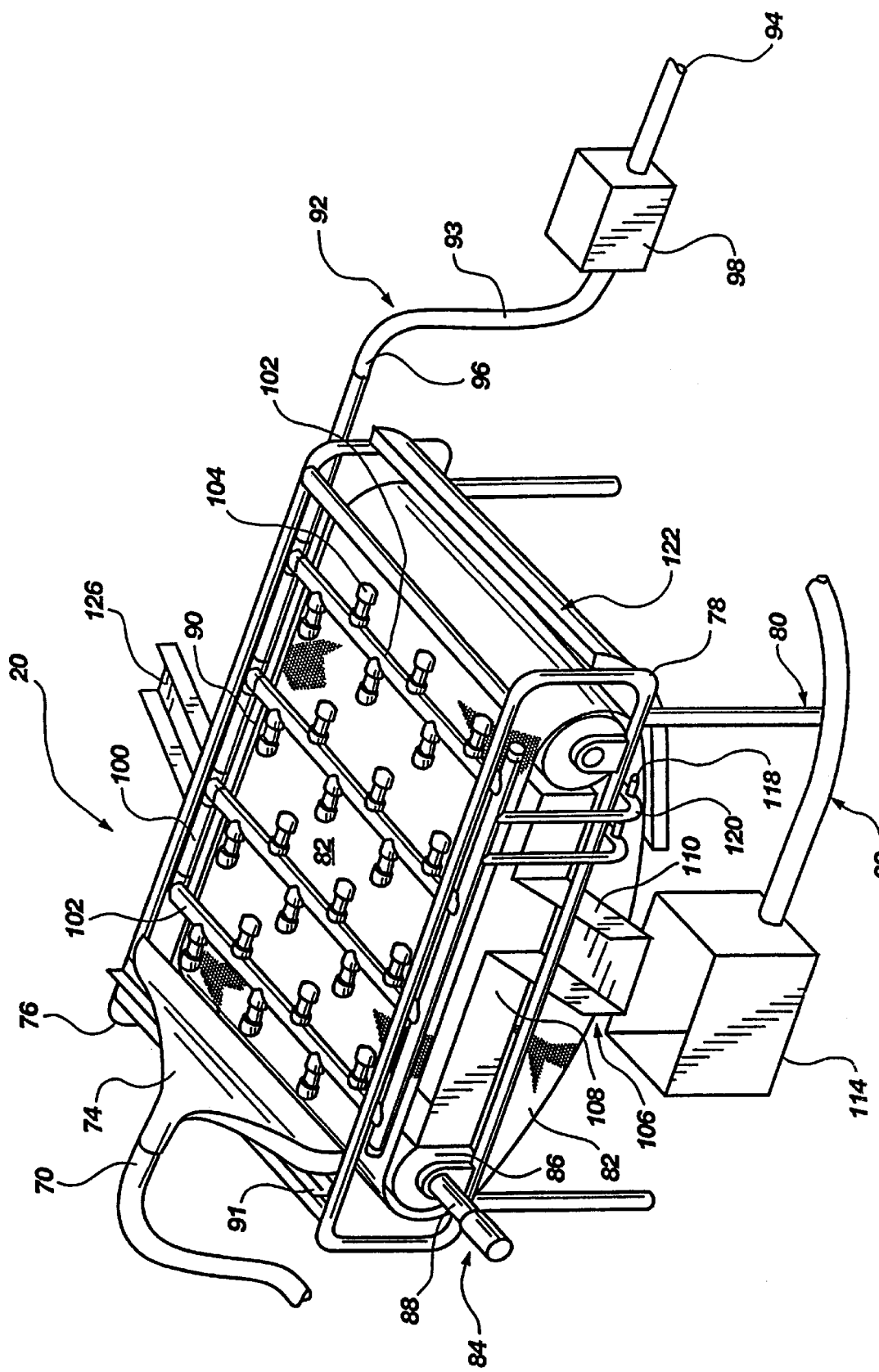
FIG. 6 is a perspective view showing a presently preferred embodiment of a filtering/cleaning assembly of one presently preferred embodiment of the apparatus for harvesting and cleaning brine shrimp eggs of the present invention.
Figure 7:
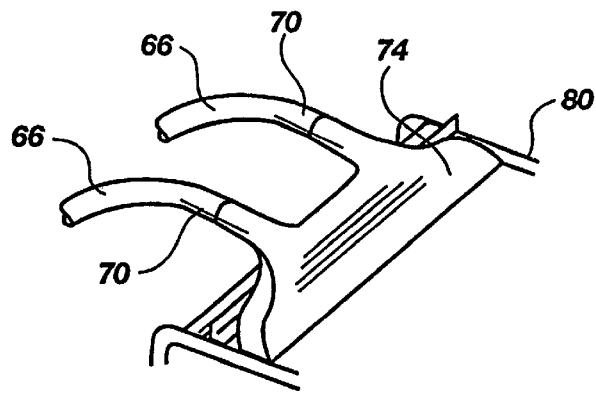
FIG. 7 is a perspective view illustrating an alternate preferred embodiment of the delivery guide of one presently preferred embodiment of the apparatus for harvesting and cleaning brine shrimp eggs of the present invention.

Referring now to FIGS. 1 and 6, the filtering/cleaning assembly 20 may be positioned on board the buoyant support frame 12 (e.g., watercraft) or in relation to some other supportable surface. As shown, the filtering/cleaning assembly 20 is preferably disposed in supportable relation to a stationary or moveable support frame 80. The support frame 80 generally provides a means for structurally supporting the various components of the filtering/cleaning assembly 20. In one presently preferred embodiment, the support frame 80 is positioned adjacent the end of the buoyant support frame 12 which supportably engages the collection assembly 18.

In preferred construction, the support frame 80 may be formed having a conventional frame structure preferably comprised of a rigid metal or other suitable material capable of supporting the components of the filtering/cleaning assembly 20. For example, the support frame 80 may be formed of a suitable metal or metal alloy having the general qualities and characteristics of being significantly immutable to deterioration which can be caused as a result of a hyper-saline environment, as to which the present invention is preferably operated. It will be readily appreciated by those skilled in the art, however, that other suitable rigid materials, such as, wood, fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, foamed, or laminated, or any other suitable composite materials are readily possible which are consistent with the spirit and scope of the present invention.

As best illustrated in FIG. 6, at least one water feeding conduit 100 is longitudinally disposed in mountable relation to the support frame 80. Preferably, one or more water feeding conduits 100 may be disposed substantially parallel to each other and longitudinally arranged on opposing sides of the support frame 80. Preferably, the water feeding conduits 100 comprise a substantially hollow channel having an internal periphery sufficient for introducing a flow of water therethrough. Engageably disposed in fluid communication with at least one water feeding conduit 100 is at least one feeding pipe 102. Similar in construction, one or more feeding pipes 102 are preferably disposed in fluid communication with the water feeding conduits 100 and formed having a substantially hollow channel defining an internal periphery sufficient for introducing a flow of water therethrough.

In one presently preferred embodiment of the present invention, the feeding pipes 102 may be engageably disposed substantially perpendicular to the water feeding conduits 100 and, accordingly, arranged dimensionally transverse the support frame 80. In current design, a plurality of feeding pipes 102 are disposed in fluid communication with one or more water feeding conduits 100. Moreover, a plurality of spray nozzles 104 may be mountably disposed in fluid communication with the feeding pipes 102 to provide a means for delivering a pressurized flow of water to an egg-permeable cleaning screen 82 of the filtering/cleaning assembly 20. The feeding pipes 102 preferably incorporate a flow control valve (not shown) whereby the flow of water delivered by the water feeding conduit 100 to the feeding pipes 102 can be selectively adjusted to provide a means for regulating the pressurized water delivered to the spray nozzles 104.

In preferred construction, the water feeding conduits 100 and the feeding pipes 102 are formed having a generally cylindrical configuration, thus providing an internal diameter sufficient for transporting a sufficient amount of water therethrough. It will be readily appreciated by those skilled in the art, however, that other shapes and/or configurations of the feeding conduits 100 and the feeding pipes 102 are possible which are consistent with the spirit and scope of the present invention.

The spray nozzles 104 may consist of one or more conventional nozzle heads preferably mounted in spaced-apart relation along the longitudinal length of the feeding pipes 102 and generally comprise the capability of being directionally disposed, if desired. As shown in FIG. 6, the spray nozzles 104 of one presently preferred embodiment of the present invention are preferably disposed in relation to the feeding pipes 102 so as to provide a directional spray which generally alternates in directional output by means of being operably directed towards opposing sides of the feeding pipes 102. Moreover, the angular direction of the spray nozzles 104 may be arranged in such a manner so that the directional spray dispensing therefrom may be directed towards the egg-permeable cleaning screen 82 so as to angularly optimize a directional stream of pressurized water whereby facilitating a washing effect or forced rolling of the passing live or dead brine shrimp or larger debris of the concentrated egg/debris mud mixture 24 to further encourage the separation of the brine shrimp eggs from the mixture.

Similarly, the directional spray of the nozzles 104 of the present invention may be configured to provide a means for spraying towards and against the movement of the cleaning screen 82 to encourage the separation of the brine shrimp eggs from the collected mud mixture 24. As will be appreciated, the spray nozzles 104 disposed along the feeding pipe 102 at a first end 76 of the filtering/cleaning apparatus 20 may be disposed in such a manner so as to provide a more narrowed, stream-lined directional spray at the distal end of the delivery guide 74 to assist in diluting the concentrated egg/debris mud mixture 24 with water. Consistent with the foregoing, other modifications in relation to the directional spray of the nozzle heads 104 are contemplated herein which are consistent with the spirit and scope of the present invention.

In preferred operation, a second extraction apparatus 92 provides a means for introducing a pressurized flow of water into one or more feeding conduits 100, wherein the water may be directed into one or more feeding pipes 102 disposed in fluid communication therewith and further delivered to an egg-permeable cleaning screen 82 by means of a plurality of spray nozzles 104 operably disposed in fluid communication with the feeding pipes 102, as discussed above. In one presently preferred embodiment of the present invention, the second extraction apparatus 92 comprises an extraction tube 93 having a first end 94, a second opposing end 96, and an intermediate portion disposed therebetween. Preferably, the second extraction apparatus 92 further includes a suction pump 98 operatively disposed in relation to the extraction tube 93.

In one preferred embodiment, the first end 94 of the extraction tube 93 is preferably disposed below the surface of the body of water in which the buoyant support frame 12 (e.g., watercraft) is floating. As best shown in FIG. 6, the second end 96 of the extraction tube 93 of the extraction apparatus 92 may be removably attached to the water feeding conduit 100 thus providing a pressurized flow of water therethrough. Correspondingly, the second end 96 of the extraction tube 93 may provide a fixed or removable attachment in relation to a first end of the water feeding conduit 100 such that the second end 96 of the extraction tube 93 does not become readily detached therefrom under the force of the water pressure generated by the suction pump 98. As will be readily appreciated by those skilled in the art, the components of the second extraction apparatus 92 may be correspondingly similar to or seemingly identical to the working components comprising the first extraction apparatus 64.

In operation, the suction pump 98 comprises a delivery means having the capacity for pumping a meaningful supply of water through the extraction tube 93 and into the water feeding conduit 100 mountably disposed in relation to the support frame 80 of the filtering/cleaning assembly 20. In this manner, the water extracted by the suction pump 98 and directed to the water feeding conduit 100 may be further pumped with sufficient pressure to the feeding pipes 102 and delivered to the egg-permeable cleaning screen 82 by means of the plurality of directional spray nozzles 104 operably disposed in fluid communication with the feeding pipes 102. The spray nozzles 104 preferably provide a spray of water having a pressurized output which is sufficient for influencing the brine shrimp eggs through the egg-permeable cleaning screen 82 and into an assembly for collecting clean egg 106, thus separating the brine shrimp eggs from the collected mud mixture 24.

Consistent with the foregoing, the water feeding conduits 100, the feeding pipes 102, and the spray nozzles 104 are preferably constructed of a suitable metal or metal alloy having the general qualities and characteristics of being significantly immutable to deterioration which can be caused as a result of a hypersaline environment, as to which the present invention is preferably operated. It will be readily appreciated by those skilled in the art, however, that other suitable materials, such as, wood fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn foamed, or laminated, or any other suitable composite materials are readily possible which are consistent with the spirit and scope of the present invention. For example, conventional PVC piping may be used for the feeding pipes 102 and the water feeding conduits 100.

Various configurations of the water conduit and piping structures, as well as the nozzle orientations as anticipated herein, may be incorporated to achieve the desired results of influencing the brine shrimp eggs through the egg-permeable cleaning screen 82. For example, in an alternate embodiment, a first water feeding conduit may be operatively connected in fluid communication to a second water feeding conduit by means of a fluid connecting member disposed in fluid communication therebetween (not shown), thus providing a flow of water from the second extraction apparatus 92 to the first water feeding conduit 100 which may operatively direct a portion of the water flow to the second water feeding conduit. It is intended, therefore, that the examples provided herein be viewed as exemplary of the principles of the present invention, and not as restrictive to a particular structure or configuration for implementing those principles.

In one presently preferred embodiment of the present invention, the cleaning screen 82 is preferably formed of a porous material which is inherently permeable to the passage of brine shrimp eggs and impermeable to the passage of any larger debris. Preferably, the egg-permeable cleaning screen 82 of the present invention comprises a screen size of approximately 350 microns. However, since the micron size of the cleaning screen 82 of the present invention should generally correspond to the dimensional size of the material or substance being harvested and cleaned, it is anticipated that the different structural elements of the cleaning screen 82 may be formed in various sizes in order to accommodate different harvesting and cleaning uses.

Figure 10:
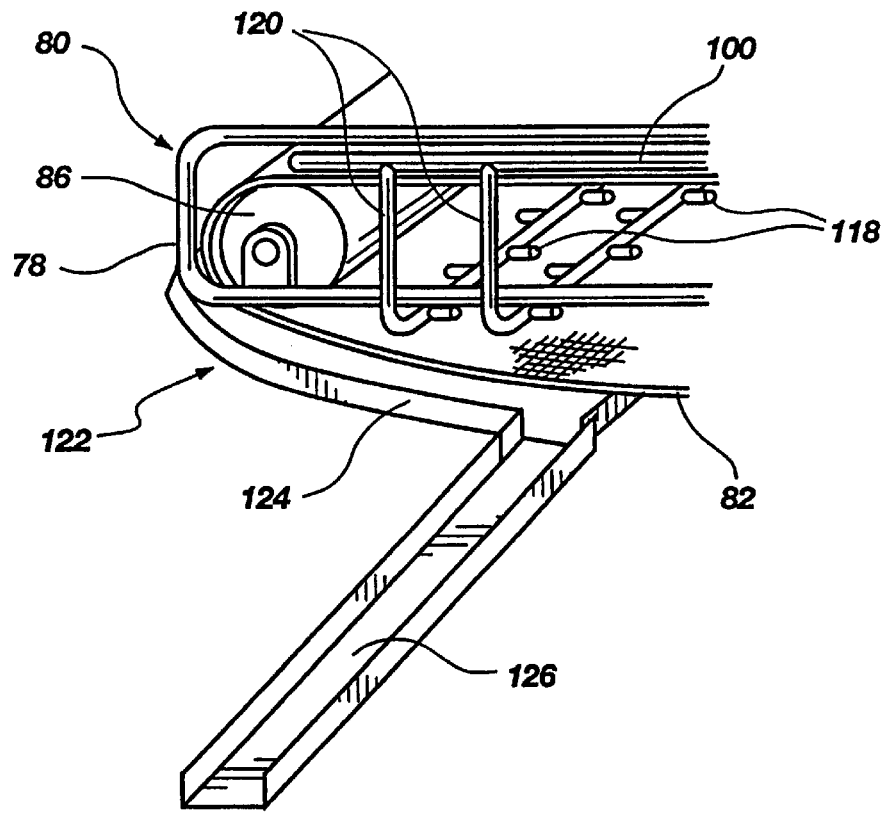
FIG. 10 is a perspective view showing one presently preferred embodiment of an assembly for disposing of unwanted debris from the concentrated egg/debris mud mixture of one presently preferred embodiment of the apparatus for harvesting and cleaning brine shrimp eggs of the present invention.

In operation, the permeability of the cleaning screen 82 preferably provides a means for filtering the brine shrimp eggs from the concentrated egg/debris mud mixture 24 collected by the collection assembly 18 and delivered to the filtering/cleaning assembly 20 by the first extraction apparatus 64. In particular, the structural characteristics of the cleaning screen 82 preferably facilitate a means for passing the brine shrimp eggs through the cleaning screen 82 and into an egg collection assembly 106, while readily retaining the remaining mud mixture 24 comprising the unwanted debris for elimination by means of a disposal assembly 122, as best shown in FIGS. 6 and 10.

Structurally, the cleaning screen 82 comprises an egg-permeable screen preferably disposed over the outer surface of a conventional endless belt frame. In one presently preferred embodiment, the cleaning screen 82 may be engageably disposed in rotatable relation to a conventional conveyor system 84, as shown in FIG. 6. The conveyor system 84 preferably comprises at least two rollers 86 disposed in relation to one or more support shafts 88 mountably engaging the support frame 80. Further, the conveyor system 84 is preferably coupled to a power source *not shown) which generally provides a means for rotatably driving at least one roller 86 and, correspondingly, the cleaning screen 82 engageably disposed in rotatable relation with the rollers 86.

In one presently preferred embodiment of the present invention, the rollers 86 of the conveyor system 84 may be mounted adjacent opposing ends of the support frame 80. Consistent with this arrangement, the cleaning screen 82 may comprise an endless construction mountably disposed in rotatable relation to the rollers 86 of the conveyor system 84 and preferably retained sufficiently taut therebetween. It can be appreciated that those skilled in the art will readily recognize other possible modifications, adaptations or mechanisms which may be constructed in accordance with the inventive principles set forth herein.

For example, an alternate preferred embodiment of the cleaning screen 182 may be formed having a substantially circular configuration, as illustrated in FIG. 8. In operation, the cleaning screen 182 may be disposed in relation to a means for horizontally rotating the cleaning screen in a single plane. Corresponding, the concentrated egg/debris mud mixture 24 collected in the collection assembly 18 may be delivered to the cleaning screen 182 by means of at least one extraction apparatus 64 disposed in fluid communication between the collection assembly 18 and the delivery guide 74 of the filtering/cleaning assembly 20.

Upon delivery, the concentrated egg/debris mud mixture 24 may be dispersed across the distal end of the delivery guide 74 to dispense the concentrated egg/debris mud mixture 24 substantially across the dimensional width of a cleaning screen 182, as discussed above. Consistent with the inventive principles of the present invention as previously outlined, a plurality of feeding pipes 102 are disposed in fluid communication with one or more water feeding conduits 100. Moreover, a plurality of spray nozzles 104 may be mountably disposed in fluid communication with the feeding pipes 102 to provide a means for delivering a pressurized flow of water to the egg-permeable cleaning screen 182 for separating the brine shrimp eggs from the collected egg/debris mud mixture 24.

As further illustrated, one or more screen-cleaning feeding pipes 120 having a plurality of spray nozzles 118 may be disposed in fluid communication with at least one water feeding conduit 100 for delivering a highly pressurized flow of water form beneath the moving cleaning screen 182, thereby providing a backwash system for removing the remaining debris of the mud mixture 24 from the cleaning screen 182. As can be appreciated, the remaining debris of the separated mud mixture 24 needs to be substantially removed from the cleaning screen 182 before the newly extracted concentrated egg/debris mud mixture 24 is delivered to the moving cleaning screen 182 by the first extraction apparatus 64.

In alternate preferred embodiments of the apparatus for harvesting and cleaning brine shrimp eggs of the present invention, one or more moving cleaning screens may be incorporated in addition to the presently preferred embodiment of the egg-permeable cleaning screen 82, whereby providing additional means for filtering and separating the brine shrimp eggs from the concentrated egg/debris mud mixture 24 collected by the collection assembly 18. As will be readily appreciated by those skilled in the art, various cleaning screen arrangements are possible which are consistent with the spirit and scope of the present invention. It is intended, therefore, that the examples provided herein be viewed as exemplary of the principles of the present invention, and not as restrictive to a particular structure or structures for implementing those principles.

As illustrated in FIG. 6, in preferred construction, the filtering/cleaning assembly 20 may comprise one or more retention guards 90, 91 which provide a means for preventing the collected mud mixture 24 delivered to the filtering/cleaning assembly 20 by the first extraction apparatus 64 from running off the sides of the cleaning screen 82, 182. The retention guards 90 are preferably disposed along the opposing longitudinal sides of the support frame 80 and generally extend substantially the length thereof to provide a barrier being flush with the upper surface of the cleaning screen 82, 182 which restricts an overflow of the concentrated egg/debris mud mixture 24 from over the sides of the cleaning screen 82, 182. In addition, a retention guard 91 may be disposed at the first end 76 of the support frame 80 and operably arranged so as to be dimensionally transverse the retention guards 90 disposed in relation to the longitudinal sides of the support frame 80, thus providing a barrier being flush with the upper surface of the cleaning screen 82, 182 to restrict an overflow of the collected mud mixture 24 at the front end of the cleaning screen 82, 182.

The retention guards 90, 91 are preferably formed of a sufficiently sturdy, resilient material having a solid construction and being capable of withstanding shock without permanent deformation. For example, the retention guards 90, 91 of one presently preferred embodiment of the present invention are formed of a natural or synthetic rubber. It will be readily appreciated by those skilled in the art, however, that other suitable resilient materials, such as, for example, closed cell polyurethane, styrene-butadiene thermoplastic elastomers, chloroprene elastomers, polycarbonate elastomers and the like are possible.

As discussed above, a plurality of spray nozzles 104 may be mountably disposed in fluid communication with the feeding pipes 102 to provide a means for delivering a directional pressurized flow of water to the cleaning screen 82, 182 of the filtering/cleaning assembly 20. In doing so, the disposition of the spray nozzles 104 preferably provide a spray of water having a pressurized output sufficient for influencing the brine shrimp eggs through the egg-permeable cleaning screen 82, 182 and into an egg collection assembly 106, thus separating the brine shrimp eggs from the collected mud mixture 24.

As illustrated in FIGS. 6 and 8, the egg collection assembly 106 for collecting clean brine shrimp eggs preferably comprises four side walls and a bottom panel contiguously disposed in relation therewith to provide a collection pan 108. Preferably, the egg collection pan 108 for collecting clean brine shrimp eggs may be supportably disposed in fixed relation to the support frame 80 of the filtering/cleaning assembly 20. In one presently preferred embodiment, the egg collection pan 108 may be disposed substantially intermediate the dimensional surface area of the upper portion and the lower portion of the endless, rotating cleaning screen 82, as best shown in FIG. 6. Correspondingly, the egg collection pan 108 may be substantially disposed the linear length of the cleaning screen 82. In an alternate embodiment of the present invention as illustrated in FIG. 8, the egg collection pan 108 may be disposed substantially beneath a portion of the dimensional surface area of the cleaning screen 182. The disposition of the egg collection pan 108 substantially corresponds to the egg collection pan 108 substantially corresponds to the disposition of the feeding pipes 102 and spray nozzles 104 which provide a means for influencing the brine shrimp eggs through the egg-permeable cleaning screen 182.

In preferred configuration, the four side walls and the bottom panel of the egg collection pan 108 provide a means for collecting brine shrimp eggs and water within its internal periphery and for diverting the collected brine shrimp eggs and water mixture into a feeding channel 110 for delivery into a receptacle 114. Consistent with the foregoing, the bottom panel of the egg collection pan 108 may be formed having a slightly slanted interior surface such that the collected brine shrimp eggs and water mixture generally travel, by means of gravity, to an outlet feeding channel 110 attached thereto. In operation, the feeding channel 110 is preferably formed in relation to the egg collection pan 108 to provide a means for delivering the separated brine shrimp egg and water mixture to the receptacle 114 without any disruption or loss of clean brine shrimp eggs.

Figure 9:
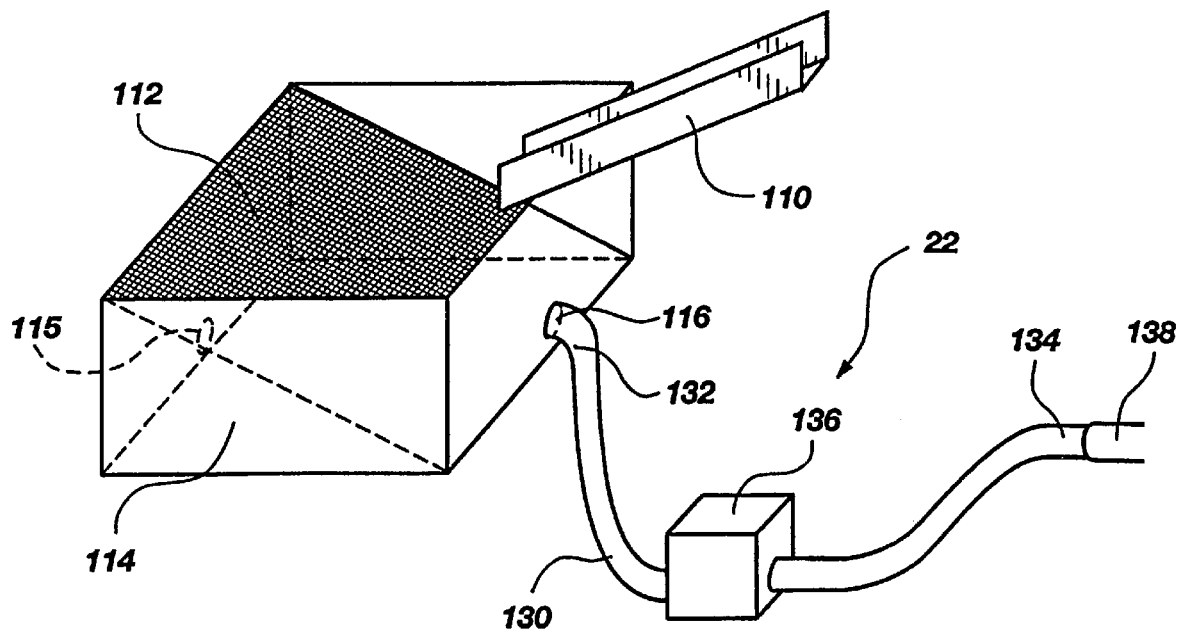
FIG. 9 is an exploded perspective view illustrating one presently preferred embodiment of an assembly for collecting "clean" brine shrimp eggs of one presently preferred embodiment of the apparatus for harvesting and cleaning brine shrimp eggs of the present invention.

As best illustrated in FIG. 9, a dewatering screen 112 may be angularly disposed within the internal periphery of the receptacle 114 to provide a means for removing excess water from the brine shrimp egg and water mixture, if desired. In the construction of one presently preferred embodiment of the present invention, the dewatering screen 112 is preferably comprised of a porous material being substantially impermeable to brine shrimp eggs and/or other larger debris, but readily permeable to the passage of water. Preferably, the dewatering screen 112 may comprise a screen size of approximately 140 microns to 150 microns. Since the size of the dewatering screen 112 of the present invention should generally be smaller in dimensional size than the material or substances being harvested, it is anticipated that the dewatering screen 112 may be formed in a series of different sizes in order to accommodate different collection uses of various materials or substances. It will be further appreciated by those skilled in the art that the dewatering screen 112 may alternatively be disposed within the internal periphery of the egg collection pan and/or at any other suitable location being consistent with the inventive principles of the present invention.

Figure 11:
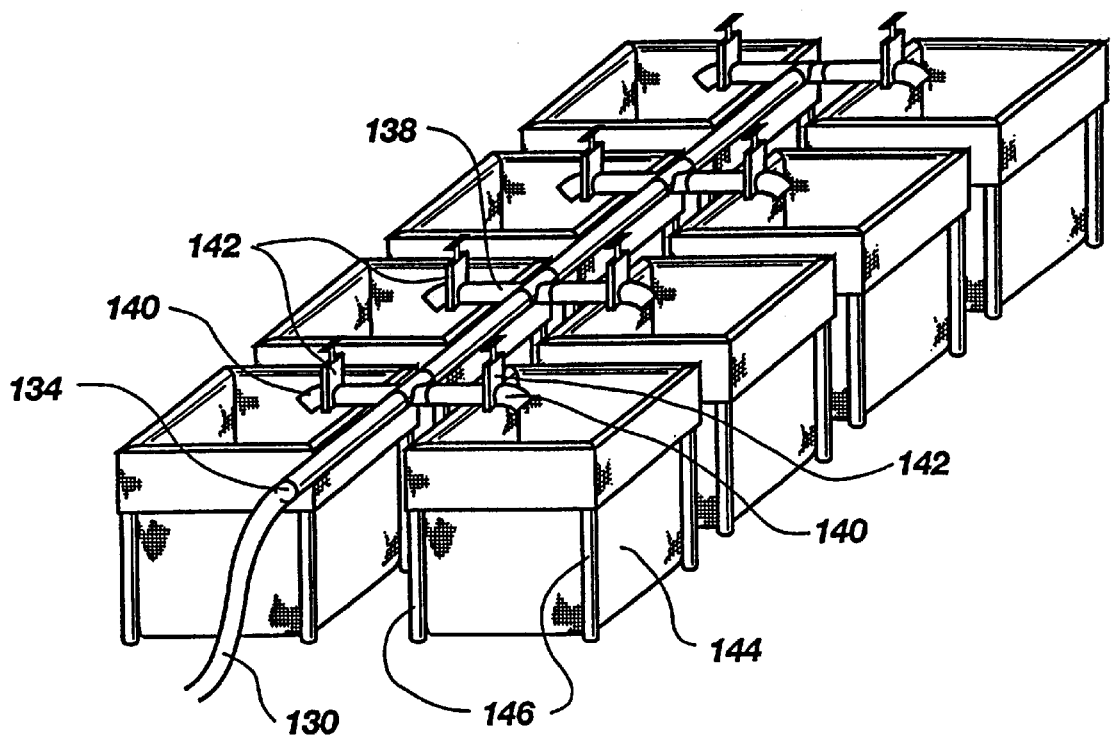
FIG. 11 is a perspective view of one presently preferred embodiment of an assembly for delivering "clean" brine shrimp eggs to one or more porous container bags of one presently preferred embodiment of the apparatus for harvesting and cleaning brine shrimp eggs of the present invention.

Preferably disposed in fluid communication with the receptacle 114, an assembly for delivering clean eggs 22 comprises a means for transporting the "clean" brine shrimp eggs collected within the receptacle 114 to at least one porous container bag 144 preferably disposed on the upper surface or deck of the buoyant support frame 12 (e.g., watercraft), as illustrated in FIGS. 1, 9 and 11. In one presently preferred embodiment of the present invention, at least one opening 116 may be integrally formed in one of the side panels of the receptacle 114, as shown in FIG. 9,. The opening 116 is preferably formed comprising an internal periphery which is sufficient for allowing the separated brine shrimp eggs and water mixture to readily pass therethrough.

In operation, the opening 116 is preferably disposed in one of the side panels of the receptacle 114 generally below the surface of the water. It will be readily appreciated by those skilled in the art, however, that one or more openings 116 may be alternatively disposed in any of the side walls, as long as the relative disposition of the opening or openings 116 are generally disposed below the surface of the water.

As further illustrated, the opening 116 formed in the receptacle 114 is designed to communicate with an assembly for delivering clean eggs 22 engageably disposed in connection therewith. Functionally, the opening 116 provides a means for focusing the brine shrimp eggs and water mixture into a first end 132 of a clean egg extraction tube 130 of the assembly for delivering clean eggs 22, whereby the "clean" brine shrimp eggs and water mixture may be removably pumped from the receptacle 114 to one or more porous container bags 144. It will be readily appreciated by those skilled in the art that since the dimensional size and shape of the opening 116 formed in the receptacle must generally correspond to the dimensional size and shape of the material or substances being collected, it is anticipated that different shapes and sizes of the opening 116 are possible to accommodate the passage of various material or substances.

Consistent with the foregoing, the assembly for delivering clean eggs 22 comprises a clean egg extraction tube 130 and a conventional delivery pump 136. The clean egg extraction tube 130 preferably includes a first end 132, a second opposing end 134, and an intermediate portion disposed therebetween. Preferably, the clean egg extraction tube 130 is engageably disposed between the opening 116 formed in the receptacle 114 and one or more porous container bags 144. In operation, the delivery pump 136 provides a conventional delivery means having sufficient capacity for transporting the brine shrimp eggs and water mixture from the receptacle 114 to one or more porous container bags 144 by way of the clean egg extraction tube 130, as best illustrated in FIGS. 9 and 11.

The second end 134 of the clean egg extraction tube 130 preferably engages a directional routing member 138. The routing member 138 preferably provides a means for selectively delivering the brine shrimp eggs and water mixture to a plurality of porous container bags 144, as best depicted in FIGS. 1 and 11. In one presently preferred embodiment of the present invention, the routing member 138 may be symmetrically bifurcated into a plurality of outlet ports 140 which comprise a conventional means for controlling the flow 142 from the outlet ports 140.

For example, one or more outlet ports 140 may be formed on one side of the routing member 138 and one or more outlet ports 140 may be disposed on the opposing side of the routing member 138. It will be apparent to those skilled in the art that other configurations may be utilized in accordance with the inventive principles set forth herein. For example, two or more routing members 138 may be used and, furthermore, any practical number of outlet ports 140 and/or porous container bags 144 are possible. It is intended therefore, that the examples provided herein be viewed as exemplary of the principles of the present invention, and not as restrictive to a particular structure for implementing those principles.

In current design, the porous container bags 144 are preferably formed of a material which is impermeable to brine shrimp eggs and readily permeable to water, thus allowing excess water to drain from the conventional porous bags while retaining the "clean" brine shrimp eggs therein. In a presently preferred configuration, one or more porous container bags 144 may be supported by a container support frame 146. Disposed in relation to the container support frame 146, the porous container bag 144 comprises a first end which may be retained in an openable position for introducing the brine shrimp eggs and water mixture therein. Correspondingly, the first end of the porous container bags 144 may be selectively arranged in a closed position to provide a means for restricting the discharge of the collected clean brine shrimp eggs.

Referring back to FIG. 9, at least one aperture 115 may be integrally formed in a side panel of the receptacle 114 preferably opposite the opening 116. The aperture 115 is preferably formed comprising an internal periphery which is sufficient for allowing water to readily pass therethrough, thus facilitating the dewatering of the brine shrimp eggs and water mixture within the receptacle 114.

The aperture 115 for dewatering the receptacle may be formed having any suitable geometrical configuration and disposed such that the internal periphery of the dewatering aperture 115 is formed at or neat the bottom of the side panel and being substantially contiguous the bottom panel of the receptacle 114. In particular, the disposition of the dewatering aperture 15 allows the extra water from the brine shrimp eggs and water mixture to pass therethrough, thus reducing the amount of water in the brine shrimp eggs and water mixture delivered to the porous container bags 144. In current design, the dewatering aperture 115 may comprise a conventional adjustment member thereby providing a means for adjusting the flow of water exiting from the receptacle 114. The excess water passing through the dewatering aperture 115 generally spills onto the deck of the buoyant support frame 12 (e.g, watercraft) and may subsequently flow overboard. In an alternate embodiment of the present invention, a tube, hose or the like may be connected to the dewatering aperture 115 to provide a means for directing the excess water directly over-board the buoyant support frame 12.

Referring now to FIGS. 6 and 10, engageably disposed in fluid communication with at least one water feeding conduit 100 is one or more screen-cleaning feeding pipes 120. The screen-cleaning feeding pipes 120 are preferably formed having a substantially hollow channel comprising an internal periphery sufficient for introducing a flow of water therethrough. In one presently preferred embodiment of the present invention, the screen-cleaning feeding pipes 120 may be engageably disposed substantially perpendicular to at least one water feeding conduit 100 and, accordingly, may be arranged dimensionally transverse the support frame 80.

In current design, a plurality of screen-cleaning feeding pipes 120 are preferably disposed in fluid communication with one or more water feeding conduits 100. Moreover, a plurality of spray nozzles 118 are mountably disposed in fluid communication with the screen-cleaning feeding pipes 120 to provide a means for delivering a highly pressurized spray of water to the cleaning screen 82 of the filtering/cleaning assembly 20. The screen-cleaning feeding pipes 120 preferably incorporate a flow control valve whereby the flow of water delivered by the water feeding conduit 100 to the feeding pipes 120 can be selectively adjusted to provide a means for regulating the pressurized water delivery to the nozzles 118.

In preferred construction, the screen-cleaning feeding pipes 120 are formed having a generally cylindrical configuration, thus providing an internal diameter sufficient for transporting a sufficient amount of water therethrough. It will be readily appreciated by those skilled in the art, however, that other shapes and/or configurations of the screen-cleaning feeding pipes 120 are possible which are consistent with the spirit and scope of the present invention. Additionally, the spray nozzles 118 may consist of one or more conventional nozzles preferably mounted in spaced-apart relation along the longitudinal length of the screen-cleaning feeding pipes 120 and comprise the capability of being directionally disposed, if desired.

In one presently preferred embodiment of the present invention as illustrated in FIG. 10, the nozzles 118 of the assembly for disposing unwanted debris 126 are preferably disposed in relation to the screen-cleaning feeding pipes 120 in such a manner so as to provide a directional spray which may generally alternate in directional output by means of being operably directed towards opposing sides of the screen-cleaning feeding pipes 120. In addition, the nozzles 118 may be arranged such that the directional spray dispensing therefrom may be directed substantially downward towards the backside of the cleaning screen 82.

In operation, the water delivered through the water feeding conduits 100 may be pumped to the screen-cleaning feeding pipes 120 and delivered against the backside of the cleaning screen 82 by means of a plurality of directional nozzles 118 disposed in fluid communication with the screen-cleaning feeding pipes 120. Correspondingly, the nozzles 118 preferably provide a dispensing spray of water having a pressurized output being sufficient for influencing the unwanted debris from the cleaning screen 82 by means of backwashing the screen 82, thus encouraging the removal of the unwanted debris of the collected mud mixture 24 from the rotating cleaning screen 82 and into a debris collection pan 124. As can be appreciated, different configurations of the piping structure and nozzle orientation as disclosed herein may be incorporated to achieve the desired results of removing the cleaning screen 82, 182 of any unwanted debris. It is intended, therefore, that the examples provided herein be viewed as exemplary of the principles of the present invention, and not as restrictive to a particular structure or configuration for implementing those principles.

Consistent with the foregoing, the screen-cleaning feeding pipes 120 and the nozzles 118 are preferably constructed of a suitable metal or metal alloy having the general qualities and characteristics of being significantly immutable to deterioration which can be caused as a result of a hypersaline environment, as to which the present invention is preferably operated. It will be readily appreciated by those skilled in the art, however, that other suitable materials, such as wood, fiberglass, graphite, ceramic, any of numerous organic, synthetic, or processed materials that are mostly thermoplastic or thermosetting polymers of high molecular weight with or without additives, such as plasticizers, auto oxidants, colorants, or fillers, which can be shaped, molded, cast extruded, drawn, foamed, or laminated, or any other suitable composite materials are readily possible which are consistent with the spirit and scope of the present invention. For example, conventional PVC piping may be used for the screen cleaning feeding pipes 120.

Referring still to FIG. 10, in one presently preferred embodiment of the present invention, the assembly for disposing of unwanted debris 126 preferably comprises four side walls and a bottom panel contiguously disposed in relation therewith to provide a debris collection pan 124. Preferably, the debris collection pan 124 is supportably disposed in fixed relation to the support frame 80 of the filtering/cleaning assembly 20. Similarly, the debris collection pan 124 may be preferably disposed beneath the lower portion of the endless, rotating egg-permeable cleaning screen 82. In particular, the debris collection pan 124 may be disposed substantially adjacent the second end 78 of the support frame 80 and preferably extends the corresponding width of the egg-permeable cleaning screen 82.

In preferred configuration, the four side walls and the bottom panel of the debris collection pan 124 provide a means for collecting the remaining debris of the concentrated egg/debris mud mixture 24 within its internal periphery and for diverting the debris into a debris feeding channel 126. Consistent with the foregoing, the bottom panel of the debris collection pan 124 may be formed having a slightly slanted interior surface such that the debris may travel, by means of gravity, to the debris feeding channel 126 attached thereto. Preferably, the debris feeding channel 126 is formed in relation to the debris collection pan 124 to provide a means for delivering the remaining debris over the side of the buoyant support frame 12 (e.g., watercraft). Although the present invention is illustrated and described in accordance with various examples provided herein in relation to the assembly for disposing unwanted debris, those skilled in the art will readily recognize other possible modifications and adaptations which are consistent with the spirit and scope of the present invention.

Although numerous techniques and methods are contemplated by the present invention, one presently preferred method for harvesting and cleaning brine shrimp eggs disposed in a mixture may comprise the steps of: (1) collecting the mixture of naturally occurring brine shrimp eggs and debris floating at or near the surface of a body of water and concentrating this mixture into a concentrated egg/debris mud mixture; (2) transporting the concentrated egg/debris mud mixture to a filtering assembly; (3) separating the brine shrimp eggs from the unwanted debris of the egg/debris mud mixture; and (4) delivering the separated brine shrimp eggs to at least one porous container. Importantly, the presently preferred method of harvesting and cleaning brine shrimp eggs of the present invention includes the step of concentrating the mixture of naturally occurring brine shrimp eggs and debris into a concentrated egg/debris mud mixture before introducing the egg/debris mixture into a collection assembly for subsequent delivery to a filtering/cleaning assembly for purposes of separating the brine shrimp eggs from the unwanted debris of the concentrated egg/debris mud mixture. This step of concentrating the mixture of naturally occurring brine shrimp eggs and debris results in a concentrated egg/debris mud mixture having a general thickness of about 7.5 cm to 45 cm (3 inches to 18 inches).

As will be readily appreciated by those skilled in the art, other possible modifications and adaptations to the presently preferred method for harvesting and cleaning brine shrimp eggs disposed in a mixture are possible which are consistent with the spirit and scope of the present invention. For example, an alternate preferred method may include the steps of: (1) obtaining an apparatus for harvesting and cleaning brine shrimp eggs 10 of the present invention, as disclosed herein; (2) manipulating a concentration member 14 around a mixture 15 of naturally occurring brine shrimp eggs and debris so as to provide a concentrated egg/debris mud mixture 24 having a general thickness of 7.5 cm to 45 cm (3 inches to 18 inches) before introducing the concentrated egg/debris mud mixture 24 into a collection assembly 18; (3) manually removing large debris from the concentrated egg/debris mud mixture 24 prior to collecting the concentrated egg/debris mud mixture 24 from the body of water; (4) transporting the collected egg/debris mud mixture 24 to a filtering/cleaning assembly 20; (5) separating the brine shrimp eggs from the concentrated egg/debris mud mixture 24 by means of an egg-permeable cleaning screen 82 and a pressurized water delivery system; and (6) delivering the separated "clean" brine shrimp eggs to at least one porous container 144.

The presently preferred method of harvesting and cleaning brine shrimp eggs of the present invention may further include the step of dispensing an angular directional spray dispensing from the nozzles 104 so as to angularly optimize a directional stream of pressurized water, thereby facilitating a washing effect or forced rolling of the passing live or dead brine shrimp or larger debris of the concentrated egg/debris mud mixture 24 to further encourage the separation of the brine shrimp eggs from the mud mixture. In addition, the presently preferred method for harvesting and cleaning brine shrimp eggs may include the step of discarding the unwanted debris of the collected mud mixture 24 by means of a disposal delivery system.

Consistent with the foregoing, a water-permeable skirt 32 may be incorporated into the structural design of the concentration member 14, if desired, to provide a means for reducing the amount of water collected within the confines of the containment member and, accordingly, to diminish the potential of generating a stirring motion in the water that may encourage the brine shrimp eggs deeper beneath the surface of the water, thereby making the potential harvest mush less efficient and productive. Similarly, a dewatering screen 112 may be incorporated into the preferred steps of the present invention for decreasing the amount of water in the clean brine shrimp egg and water mixture before delivery to one or more porous containers 144.

Figure 12:
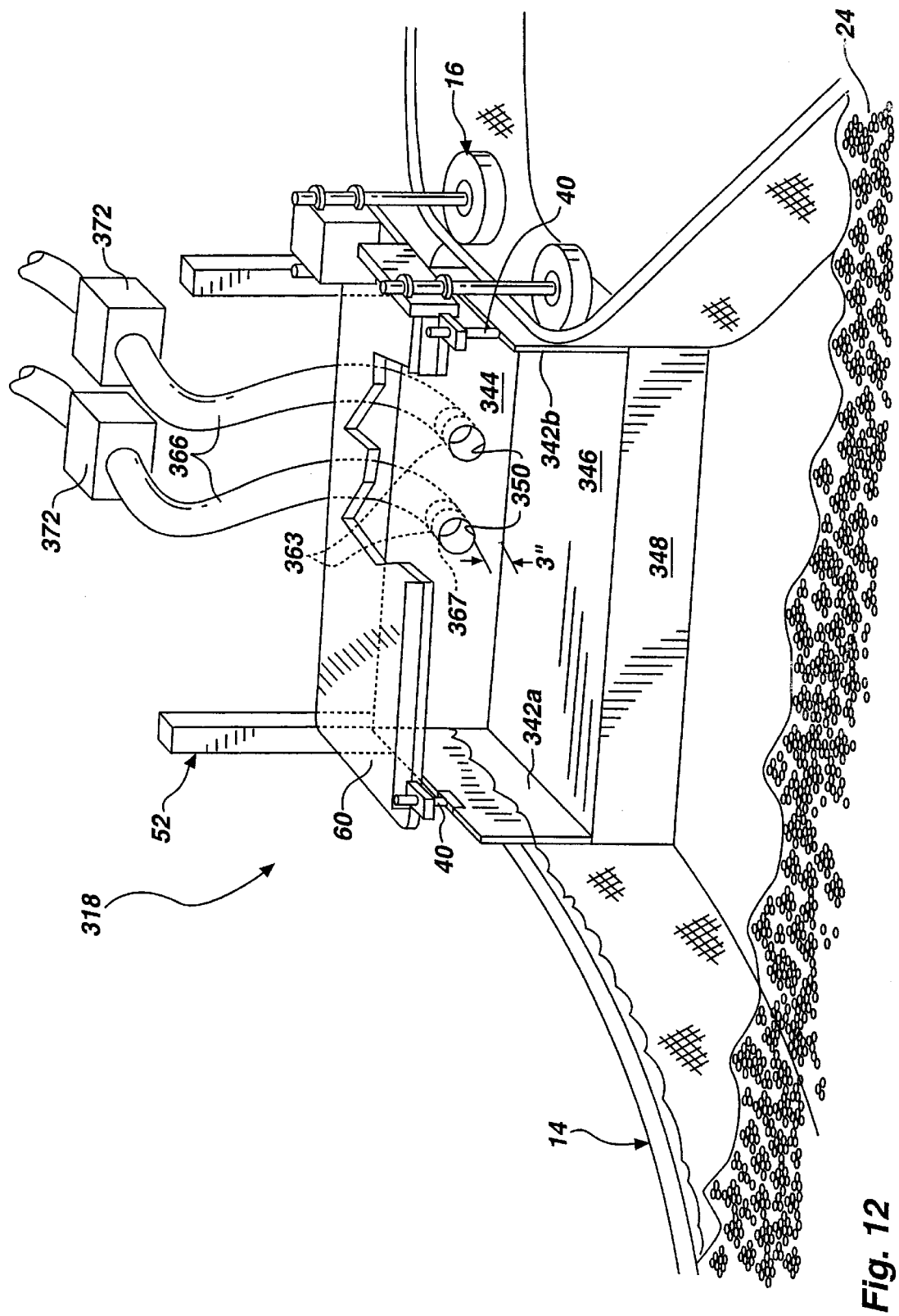
FIG. 12 is a perspective view of one alternative presently preferred embodiment of a collection assembly of the apparatus for harvesting and cleaning brine shrimp eggs.

Alternative presently preferred embodiments of the collection assembly of the present invention are shown in FIGS. 12 and 13. The collection assemblies of FIGS. 12 and 13 may be constructed similarly to the earlier disclosed collection assemblies with the modifications hereinafter described.

As shown in FIG. 12, in one presently preferred embodiment, the collection assembly or collection device 318 preferably includes a base member 346, as well as means for extracting brine shrimp eggs and means for positioning the extraction means as will be understood more fully hereafter.

The base member 346 is preferably positioned in a substantially horizontal orientation with respect to the surface of the body of water, as shown in FIG. 12. The horizontal orientation of the base member 346 facilitates entry of the brine shrimp eggs into the collection assembly 318 for their subsequent extraction from the body of water.

As mentioned, the collection assembly 318 further includes means for extracting the brine shrimp eggs from the body of water. The extraction means serves to extract or remove brine shrimp eggs from the body of water, thereby accomplishing a harvest of the brine shrimp eggs.

Presently preferred embodiments of the extraction means of the present invention will now be described referring to FIGS. 12 and 13.

As an important feature of the present invention, means for positioning the extraction means are provided so as to position the extraction means at least three inches vertically from the base member 346. Accordingly, in one presently preferred embodiment of the collection assembly 318, the extraction means is permanently disposed at least three inches vertically from the base member 346. As a result, the extraction means typically will not function properly to extract brine shrimp eggs from the body of water unless the base member 346 is disposed at least three inches below the upper surface of the brine shrimp eggs, and, practically speaking, the surface of the water. Because the egg mud mixture 24 floats at the upper surface of the body of water, the upper surface of the brine shrimp eggs typically coincides roughly with the surface of the body of water. Thus, in effect, the extraction means typically will not function properly to extract brine shrimp eggs from the body of water unless the base member 346 is disposed at least three inches below the surface of body of water.

As shown in FIG. 12, the collection assembly 318 preferably further includes a back wall 344 positioned at an angle to the base member 346. The back wall 344 Is preferably connected to and positioned substantially perpendicular to the base member 346 so as to form an L-shape. Thus, in one presently preferred embodiment, the angle between the back wall 344 and base member 346 is about 90 degrees. The back wall 344 serves to contain and hold the brine shrimp egg mud mixture 24 for its subsequent extraction, thereby substantially preventing the mixture 24 from simply traveling under the boat 12.

As illustrated in FIG. 12, in one presently preferred embodiment, the extraction means includes one or more openings 350 in the back wall 344 for allowing passage of the brine shrimp eggs therethrough. Although two openings 350 are shown in FIG. 12, any number of openings (including only one) could be disposed on the back wall 344.

In the preferred embodiment of FIG. 12, the extraction means includes two substantially similar openings 350. The openings 350 are each positioned at least three inches vertically from the base member 346, and in one presently preferred embodiment, are at from about three inches to about three and one half inches therefrom.

A conduit 366 and a coupling member 363 are provided to facilitate extraction of the brine shrimp eggs. In one presently preferred embodiment, the coupling member 363 is capable of releasable connection to the conduit 366. The coupling member 363 functions to operably connect the conduit 366 to the opening 350.

In one presently preferred embodiment, as shown in FIG. 12, the opening 350 is formed in one end of the coupling member 363. In addition, the coupling member 363 may be formed as a substantially rigid, hollow pipe connected to the back wall 344 such that the opening 350 leads into the coupling member 363. The conduit 366 may be flexible tubing capable of being stretched and placed over the end of the coupling member 363 distal the opening 350. It will be appreciated by those skilled in the art that a variety of fasteners may be used to more securely connect the conduit 366 to the coupling member 363. For example, a clamp (not shown) or an adjustable metal ring (not shown) may be used to secure the conduit 366 to the coupling member 363.

In the embodiment of FIG. 12, a weld 367 connects the coupling member 363 to the back wall 344 so as to provide means for rigidly and permanently positioning the coupling member 363 with respect to the base member 346. The diameter of the conduit 366 may be substantially similar to the diameter of the opening 350 such that the weld 367 connects the opening 350 and conduit 366 to form a substantially uniform channel.

Thus configured, the opening 350, coupling member 363, and conduit 366 create a channel capable of transporting extracted brine shrimp eggs therethrough. Preferably a pump 372 is also provided to facilitate extraction of the brine shrimp eggs. As seen in FIG. 12, the pump 372 is connected to conduit 366 so as to be in fluid communication therewith. The pump 372 operates to provide suction to the opening 350 to thereby extract brine shrimp eggs from the body of water.

As shown in FIG. 12, in one presently preferred embodiment, the extraction means for removing brine shrimp eggs from a body of water includes dual and symmetrical extraction systems(two openings 350, two conduits 366, two pumps 372, etc.). However, it will be appreciated by one skilled in the art that only one extraction system is required for proper operation of the collection assembly. The embodiment illustrated in FIG. 13 also includes dual extraction systems.

To further contain and hold the brine shrimp egg mud mixture 24, the collection assembly 318 may further comprise two opposing side walls 342a, 342b connected to the base member 346. In the embodiments illustrated in FIGS. 12 and 13, the side walls 342a, 342b are substantially perpendicular to the back wall 344 and substantially parallel to each other. It will be appreciated, however, that the side walls 342a, 342b may be oriented differently if desired, as shown by the configuration of the side walls 42a, 42b in FIG. 3.

The collection assembly 318 may also include a lip 348 connected to the base member 346 so as to extend downwardly and form an L-shape therewith. The lip 348 functions to substantially keep the egg mud mixture 24 from traveling under the boat.

FIG. 13 illustrates an alternative presently preferred embodiment of the collection assembly 418 of the present invention. As shown, the extraction means includes an opening 450 disposed at least three inches (and in one presently preferred embodiment, from about three inches to about three and one half inches) vertically from the base member 446 such that the opening 450 is substantially parallel to the base member 446.

A conduit 466 and a coupling member 463 are preferably also provided. In one presently preferred embodiment, the coupling member 463 is capable of releasable connection to the conduit 466. The opening 450 of the extraction means may be an opening 450 formed in one end of the coupling member 463. The coupling member 463 and conduit 466 may be formed similarly to the coupling member 363 and conduit 366 of FIG. 12 in that the conduit 466 may be a flexible tube capable of being placed onto the rigid coupling member 463.

As can be seen in FIG. 13, the coupling member 463 may be placed in a substantially vertical orientation. An advantage of this extraction means is that, with the opening 450 being parallel to the base member 446, a substantial portion of the area of the opening 450 is in contact with the brine shrimp egg mud mixture 24, thereby utilizing most of the opening 450 in extracting the mud mixture 24.

In presently preferred embodiments of the present invention, the extraction means may include the structures as discussed with reference to FIGS. 12 and 13. However, it will be understood that the extraction means may also take the form of other structures that may be used to extract brine shrimp eggs from a body of water. For example, the extraction means may include, in an alternate embodiment, a conveyor-belt type of system (not shown) for extracting brine shrimp eggs. Such a conveyor-belt type of system may include a rotating belt having scoops thereon disposed such that, when the belt is rotated, the scoops dip into the water, wherein the scoops are at least three inches above the base member 346, and scoop out brine shrimp eggs and deliver them to an awaiting container.

The positioning means of FIG. 13 may include one or more mounting brackets 467 connecting the coupling member 463 to the back wall 444. The mounting bracket 467, in one presently preferred embodiment, is a rigid metal bracket welded to the back wall 444 and welded to the coupling member 463 thereby rigidly connecting the back wall 444 and the coupling member 463. It will be appreciated that those skilled in the art could use a variety of configurations to achieve the positioning means.

A pump (not shown) may also be provided in fluid communication with the conduit 466. The pump may provide suction to the conduit 466 for extracting brine shrimp eggs from the body of water.

The collection assembly 418 may include two opposing side walls 442a, 442b, similar to the collection assembly 318 of FIG. 12. In one presently preferred embodiment, the side walls 442a, 442b may be substantially perpendicular with the back wall 444 and substantially parallel to each other.

The collection assemblies 318, 418 of FIGS. 12 and 13, may also include other structural elements as discussed in relation to FIG. 3. Those elements have been like numbered in FIGS. 12 and 13. For example, a convention lift assembly 52, a platform 60, support members 40, a concentration member 14, and a boom retrieval member 16 may also be used with the collection assemblies 318, 418 or FIGS. 12 and 13.

The alternative preferred collection assemblies 318, 418 as illustrated in FIGS. 12 and 13 may be used with the apparatus 10 for harvesting brine shrimp eggs as discussed and disclosed herein. Such an apparatus 10 may function similarly to the harvesters associated with FIGS. 1–11, with the differences being in the alternative embodiments of the collection assemblies 318, 418. The collection assemblies 318, 418, as disclosed in FIGS. 12 and 13, may be used in combination with a floating support member 12 and a concentration member 14 for concentrating the eggs into a concentrated egg mud mixture 24 prior to extraction of the eggs from the body of water. The apparatus 10 may also include a delivery system 22 for delivering the eggs to at least one porous container 144.

The collection assemblies 318, 418 may include bypass means, as disclosed and discussed in relation to FIG. 5, for allowing a portion of the egg mud mixture 24 to flow around the collection assembly 318, 418.

The apparatus 10 may also include a boom retrieval apparatus 16, or boom retrieval member 16, capable of operably engaging the containment boom 14 to retrieve the containment boom 14.

A method for harvesting brine shrimp eggs from a body of water may be used in combination with the collection assemblies 318, 418 of FIGS. 12 and 13. The method may include the steps of providing a collection device 318, 418 (or collection assembly) having a base member 346, 446; positioning the base member 346, 446 in a substantially horizontal orientation; providing means for extracting the brine shrimp eggs from the body of water such that the extraction means is at least three inches vertically from the base member 346, 446; positioning the base member 346, 446 so as to be below at least a portion of the eggs; and extracting the eggs from the body of water through the extraction means.

Before extracting the eggs from the body of water, the eggs may be concentrated into a concentrated egg mud mixture 24. The step of concentrating the eggs may be accomplished by substantially encircling the eggs with a containment boom 14.

The egg mud mixture 24 typically has a thickness of from about 7.5 cm to about 45 cm. Over the duration of harvesting brine shrimp eggs, meaning from the time a colony is encircled to when it is substantially harvested, the egg mud mixture 24 typically had an average thickness of from about 15 cm to about 20 cm.

As discussed earlier, once the eggs have been extracted from the body of water, they may be delivered to at least one porous container 144.

Also discussed earlier in relation to the collection assemblies 318, 418, a lip 348, 448 may be provided connected to the base member 346, 446 so as to extend downwardly to form an L-shape. The lip 348, 448 functions to substantially prevent the passage of the egg mud mixture 24 and included brine shrimp eggs under the base member 346, 446, and potentially under the boat 12.

The collection assemblies as shown in FIGS. 12 and 13 provide several benefits over the prior art collection assemblies. For example, the extraction means disposition at least three inches vertically from the base member provides more egg/debris mud mixture above the base member than egg above prior-art skimming devices. This allows larger quantities of brine shrimp eggs to be harvested from the collection assembly. In other words, the collection assembly of the present invention is capable of harvesting substantially larger quantities of brine shrimp eggs than the skimming devices of the prior art.

Another benefit of the collection assemblies of FIGS. 12 and 13 is that they allow any debris (such as sand) to sink away from the extraction means so that the debris is not funneled directly into the extraction means. Because there is at least three inches between the extraction means and the base member, the debris (such as sand) heavier than the brine shrimp eggs will tend to sink below the eggs. Accordingly, much of this heavier debris sinks below the extraction means and settles on the base member. Many prior art devices have openings at the same level or lower than the bottom floor of their collection system. With these prior art devices, the heavier debris is funneled directly into the opening. As pointed out, the presently preferred embodiments of the collection assemblies of FIGS. 12 and 13 allow the debris to sink away from the extraction means so that a more pure egg mud mixture may be harvested.

From the above discussion, it will be appreciated that the present invention provides novel apparatus and methods for harvesting and cleaning brine shrimp eggs which provide means for separating brine shrimp eggs from a concentrated egg/debris mud mixture, thereby depositing "clean" brine shrimp eggs into one or more porous container bags. Further, the present invention uses a concentration member for encircling, retaining and concentrating one or more floating colonies of brine shrimp eggs and debris for harvesting as a concentrated egg/debris mud mixture, without the need to manipulate a watercraft through a body of water in order to maneuver a leading edge for skimming the water surface. Similarly, the present invention may consist of a novel concentration member having a water-permeable skirt disposed in relation to a buoyant crown which allows for the passage of water therethrough, while being impermeable to the passage of brine shrimp eggs and/or debris.

Unlike the prior art, the present invention facilitates a more efficient mode of harvesting in relation to the time and labor expended by way of separating brine shrimp eggs from the unwanted debris collected as part of the concentrated egg/debris mud mixture, thus increasing overall productivity and competitive economic advantage. Moreover, the apparatus and techniques of the present invention simplify the harvesting process of the brine shrimp eggs.

Consistent with the foregoing, although the title of the present invention and the detailed description as herein provided are particularly focused on an application of the present invention to the harvesting and cleaning of brine shrimp eggs, it will be readily appreciated by those skilled in the art that the inventive principles set forth herein may be applied to the harvesting and cleaning of other materials or substances floating at or near the surface of a body of water. In particular, the features of the present invention may be readily adapted to collect and separate other types of floating materials or substances from a mixture. Therefore, it is intended that the presently preferred application of the present invention for harvesting and cleaning brine shrimp eggs as disclosed herein be viewed as exemplary of the principles of the present invention, and not as restrictive to a particular material or substance for implementing those principles.

Accordingly, the present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for harvesting brine shrimp eggs from a body of water, comprising:

an elongated member comprising buoyant material which enables said elongated member to float at or near the surface of the body of water;

a water-permeable member attached to and positioned downwardly from said elongated member so as to enable said water-permeable member to be positioned below the surface of the body of water, said water-permeable member being configured so as to be substantially impermeable to brine shrimp eggs; and a first reinforcement member positioned adjacent said water-permeable member, said first reinforcement member having substantially greater strength than said water-permeable member, wherein said first reinforcement member further comprises a plurality of reinforcing strips to provide additional strength to said first reinforcement member.

2. An apparatus as defined in claim 1 wherein said elongated member is a containment boom.

3. An apparatus as defined in claim 1 wherein said buoyant material comprises synthetic resinous material.

4. An apparatus as defined in claim 1 wherein said buoyant material comprises polypropylene.

5. An apparatus as defined in claim 1 wherein said buoyant material comprises polystyrene.

6. An apparatus as defined in claim 1 wherein said elongated member further comprises a covering positioned around said buoyant material.

7. An apparatus as defined in claim 6 wherein said covering comprises polyvinyl chloride.

8. An apparatus as defined in claim 7 wherein a plasticizer is included in said polyvinyl chloride.

9. An apparatus as defined in claim 6 wherein said covering comprises polyvinyl chloride coated on a nylon substrate.

10. An apparatus as defined in claim 6 wherein said covering comprises polyvinyl chloride coated on a polyester substrate.

11. An apparatus as defined in claim 6 wherein said covering comprises polyurethane.

12. An apparatus as defined in claim 6 further comprising a cable and a flap, said flap being contiguous with said covering and said flap comprising a cavity therein for housing said cable.

13. An apparatus as defined in claim 12 wherein an opening is formed in one end of said flap so as to expose a portion of said cable and wherein said apparatus further comprises a locking mechanism for securing said exposed portion of said cable in place.

14. An apparatus as defined in claim 1 further comprising a cable mounted to said elongated member.

15. An apparatus as defined in claim 1 wherein said water-permeable member comprises a polymeric material.

16. An apparatus as defined in claim 1 wherein said water-permeable member comprises nylon.

17. An apparatus as defined in claim 1 wherein said water-permeable member comprises polyester.

18. An apparatus as defined in claim 1 wherein said water-permeable member has a mesh size of about 200 microns or less.

19. An apparatus as defined in claim 1 wherein said water-permeable member has a mesh size of about 160 microns or less.

20. An apparatus as defined in claim 1 wherein said water-permeable member has a mesh size of from about 80 microns to about 150 microns.

21. An apparatus as defined in claim 1 wherein said water-permeable member has a vertical depth of from about 6 inches to about 84 inches.

22. An apparatus as defined in claim 1 wherein said water-permeable member has a vertical depth of from about 36 inches to about 72 inches.

23. An apparatus as defined in claim 1 wherein said water-permeable member has a vertical depth of about 60 inches.

24. An apparatus as defined in claim 1 wherein said water-permeable member further comprises a plurality of reinforcing strips to provide additional strength to said water-permeable member.

25. An apparatus as defined in claim 24 wherein said reinforcing strips comprise polyvinyl chloride.

26. And apparatus as defined in claim 25 wherein a plasticizer is included in said polyvinyl chloride.

27. An apparatus as defined in claim 24 wherein said reinforcing strips comprise polyvinyl chloride coated on a nylon substrate.

28. An apparatus as defined in claim 24 wherein said reinforcing strips comprise polyvinyl chloride coated on a polyester substrate.

29. An apparatus as defined in claim 24 wherein said reinforcing strips comprise polyurethane.

30. An apparatus as defined in claim 24 wherein the reinforcing strips positioned most closely towards the ends of said water-permeable member are wider than all other of said reinforcing strips.

31. An apparatus as defined in claim 1 further comprising a weighted member positioned along a bottom edge of said water-permeable member.

32. An apparatus as defined in claim 31 wherein said weighted member is a chain.

33. An apparatus as defined in claim 1 further comprising a weighted member and a flap, said flap being positioned along a bottom edge of said water-permeable member and said flap comprising a cavity therein for housing said weighted member.

34. An apparatus as defined in claim 33 wherein said weighted member is a chain.

35. An apparatus as defined in claim 33 wherein an opening is formed in one end of said flap so as to expose a portion of said weighted member and wherein said apparatus further comprises a locking mechanism for securing said exposed portion of said weighted member in place.

36. An apparatus as defined in claim 1 further comprising a connecting member positioned at each end of the apparatus.

37. An apparatus as defined in claim 36 wherein each said connecting member includes one or more grooves that are capable of engaging one or more grooves of another connecting member of another apparatus so as to allow for two or more of said apparatus to be connected together.

38. An apparatus as defined in claim 36 wherein said apparatus further comprises one or more locking pins and wherein each said connecting member includes one or more holes therethrough such that the one or more holes in one connecting member of the apparatus may be aligned with the one or more holes in one connecting member of another of said apparatus and said locking pins may be inserted therethrough so as to connect said two apparatus.

39. An apparatus as defined in claim 1 wherein said first reinforcement member has a substantially greater mesh size than said water-permeable member.

40. An apparatus as defined in claim 1 wherein said first reinforcement member has a mesh size of at least about 400 microns.

41. An apparatus as defined in claim 1 wherein said first reinforcement member comprises nylon.

42. An apparatus as defined in claim 1 further comprising a second reinforcement member positioned adjacent said water-permeable member, said second reinforcement member having substantially greater strength than said water-permeable member, said water-permeable member being positioned between said first reinforcement member and said second reinforcement member.

43. An apparatus for harvesting brine shrimp eggs from a body of water, comprising:
   a containment boom which is capable of encircling a plurality of brine shrimp eggs, said containment boom comprising buoyant material which enables said containment boom to float on the surface of the body of water;
   a porous screen which is water-permeable, said porous screen being mounted to said containment boom so as to hang downwardly therefrom and so as to be capable of being positioned below the surface of the body of water, said porous screen having a mesh size which renders said porous screen substantially impermeable to brine shrimp eggs; and
   a plurality of reinforcing strips applied to said porous screen so as to provide additional strength to said porous screen, said reinforcing strips being constructed of a substantially stronger material than said porous screen.

44. An apparatus as defined in claim 43 wherein said buoyant material comprises synthetic resinous material and wherein said containment boom further comprises a covering positioned around said buoyant material.

45. An apparatus as defined in claim 44 further comprising a cable for facilitating manipulation of said containment boom and a flap, said flap being contiguous with said covering and said flap having a cavity therein for housing said cable.

46. An apparatus as defined in claim 43 wherein said porous screen has a mesh size of about 160 microns or less and a vertical depth of from about 36 inches to about 72 inches.

47. An apparatus as defined in claim 43 further comprising a chain and a flap, said flap being positioned along a bottom edge of said porous screen and said flap having a cavity therein for housing said chain, said chain serving to provide weight to the bottom edge of said porous screen so as to keep said porous screen more vertical when moved through the body of water.

48. An apparatus as defined in claim 43 further comprising a first reinforcement screen and a second reinforcement screen positioned on opposing sides of said porous screen such that said porous screen is positioned therebetween, said first and second reinforcement screens being constructed of a substantially stronger material than said porous screen and having a substantially greater mesh size than said porous screen.

49. An apparatus as defined in claim 43:

wherein said buoyant material comprises synthetic resinous material and wherein said containment boom further comprises a covering positioned around said buoyant material;

wherein said apparatus further comprises a cable for facilitating manipulation of said containment boom and a first flap, said first flap being contiguous with said covering and said first flap having a cavity therein for housing said cable;

wherein said porous screen is made of a polymeric material, has a mesh size of about 160 microns or less, and has a vertical depth of from about 36 inches to about 72 inches;

wherein said apparatus further comprises a plurality of reinforcing strips applied to said porous screen so as to provide additional strength to said porous screen, said reinforcing strips being constructed of a substantially stronger material than said porous screen;

wherein said apparatus further comprises a first reinforcement screen and a second reinforcement screen positioned on opposing sides of said porous screen such that said porous screen is positioned therebetween, said first and second reinforcement screens being constructed of a substantially stronger material than said porous screen and having a substantially greater mesh size than said porous screen; and wherein said apparatus further comprises a chain and a second flap, said second flap being positioned along a bottom edge of said porous screen and said second flap having a cavity therein for housing said chain, said chain serving to provide weight to the bottom edge of said porous screen so as to keep said porous screen more vertical when moved through the body of water.

50. A method of harvesting brine shrimp eggs from a body of water, comprising the steps of:

positioning at or near the surface of the body of water an elongated member comprising buoyant material which enables said elongated member to float;

positioning downwardly from said elongated member and below the surface of the body of water a water-permeable member which is configured so as to be substantially impermeable to brine shrimp eggs;

providing a first reinforcement member adjacent said water-permeable member, said first reinforcement member having substantially greater strength than said water-permeable member;

providing a second reinforcement member adjacent said water-permeable member, said second reinforcement member having substantially greater strength than said water-permeable member, said water-permeable member being positioned between said first reinforcement member and said second reinforcement member; and moving said elongated member and said water-permeable member with respect to the body of water so as to collect brine shrimp eggs.

51. A method as defined in claim 50 further comprising the step of providing a cover around the buoyant material of said elongated member.

52. A method as defined in claim 51 further comprising the step of providing a flap contiguous with said covering and providing a cable within a cavity formed in said flap, said flap and cable facilitating manipulation of said elongated member.

53. A method as defined in claim 50 wherein said water-permeable member has a mesh size of about 200 microns or less.

54. A method as defined in claim 50 wherein said water-permeable member has a mesh size of about 160 microns or less.

55. A method as defined in claim 50 wherein said water-permeable member has a mesh size from about 80 microns to about 150 microns.

56. A method as defined in claim 50 wherein said water-permeable member has a vertical depth of from about 6 inches to about 84 inches.

57. A method as defined in claim 50 wherein said water-permeable member has a vertical depth of from about 36 inches to about 72 inches.

58. A method as defined in claim 50 wherein said water-permeable member has a vertical depth of about 60 inches.

59. A method as defined in claim 50 further comprising the step of providing a plurality of reinforcing strips to said water-permeable member so as to provide additional strength thereto.

60. A method as defined in claim 50 further comprising the step of providing a plurality of reinforcing strips on said first reinforcement member so as to provide additional strength thereto.

61. A method as defined in claim 50 further comprising the step of providing a flap along a bottom edge of said water-permeable member and providing a weighted member within a cavity formed in said flap, said weighted member serving to provide weight to the bottom edge of said water-permeable member so as to keep said water-permeable member more vertical when moved with respect to the body of water.

62. A method as defined in claim 61 wherein said weighted member is a chain.

63. A method as defined in claim 50 further comprising the step of providing another said elongated member with another said water-permeable member positioned downwardly therefrom, and connecting the two elongated members together.

64. A method as defined in claim 50:

wherein said elongated member is a containment boom which is positioned so as to encircle a plurality of brine shrimp eggs; and wherein said water-permeable member is a porous screen mounted to said containment boom so as to hang downwardly therefrom, said porous screen having a mesh size which renders said porous screen substantially impermeable to brine shrimp eggs.

* * * * *